(12) United States Patent
Murayama et al.

(10) Patent No.: US 8,498,912 B2
(45) Date of Patent: Jul. 30, 2013

(54) CHARGE MANAGING SYSTEM, IMAGE FORMING APPARATUS, CHARGE MANAGING SERVER, AND IMAGE FORMING METHOD

(75) Inventors: Midori Murayama, Tokyo (JP); Chikara Kishi, Kanagawa (JP); Hidenao Ubukata, Kanagawa (JP); Minoru Saito, Kanagawa (JP); Minoru Sakai, Kanagawa (JM); Naoki Wakasugi, Kanagawa (JP); Nobumitsu Samukawa, Kanagawa (JP); Toshiyuki Shimizu, Kanagawa (JP); Yasushi Ogawa, Kanagawa (JP); Yoshiroh Someya, Kanagawa (JP); Ryosuke Sako, Kanagawa (JP); Kazumi Hanada, Tokyo (JP); Kentaroh Murakawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/411,000

(22) Filed: Mar. 2, 2012

(65) Prior Publication Data
US 2012/0166361 A1 Jun. 28, 2012

Related U.S. Application Data

(63) Continuation of application No. 12/123,737, filed on May 20, 2008, now Pat. No. 8,156,020.

(30) Foreign Application Priority Data

Jun. 8, 2007 (JP) ................ 2007-153317
Jun. 8, 2007 (JP) ................ 2007-153318

(51) Int. Cl.
*G07F 19/00* (2006.01)
*G07B 17/00* (2006.01)
*G06Q 40/00* (2012.01)
*G06Q 40/02* (2012.01)
*G06K 15/00* (2006.01)
*G06Q 30/04* (2012.01)

(52) U.S. Cl.
CPC .................... *G06Q 40/10* (2013.01); *G06Q 40/02* (2013.01); *G06K 15/00* (2013.01); *G06Q 30/04* (2013.01)
USPC ............... 705/34; 705/30; 705/32; 358/1.13; 358/1.14; 358/1.15

(58) Field of Classification Search
CPC .......... G06Q 40/10; G06Q 30/04; G06Q 40/02; G06K 15/00
USPC .............. 705/30, 32, 412, 34; 358/1.13–1.15
See application file for complete search history.

(56) References Cited

U.S. PATENT DOCUMENTS 4,809,185 A * 2/1989 Talmadge ...................... 705/403
5,625,690 A * 4/1997 Michel et al. ................... 705/53
(Continued)

FOREIGN PATENT DOCUMENTS

JP 2003-66796 3/2003
JP 2003-241950 * 8/2003
(Continued)

OTHER PUBLICATIONS

Japanese Office Action mailed Dec. 6, 2011 issued for JP Application No. 2007-153318, filed on Jun. 8, 2007.

*Primary Examiner* — Olusegun Goyea
(74) *Attorney, Agent, or Firm* — Oblon, Spivak, McClelland, Maier & Neustadt, L.L.P.

(57) ABSTRACT

A charge managing system including an image forming apparatus and a charge managing server is provided. The image forming apparatus includes plural applications each configured for executing a specific process on input data, a counter unit that counts a number of result items output as a result of executing at least one of the applications, a count value storage unit that stores a count value corresponding to the number of result items counted by the counter unit, and a storage area setting unit that secures a plurality of storage areas within the count value storage unit each of which storage areas is configured for storing a corresponding count value obtained for each of the applications. The charge managing server manages charging a fee for using the image forming apparatus based on the corresponding count value stored in each of the storage areas secured for each of the applications.

11 Claims, 18 Drawing Sheets

U.S. PATENT DOCUMENTS

| | | | | |
|---|---|---|---|---|
| 6,025,925 | A * | 2/2000 | Davidson et al. | 358/1.15 |
| 6,219,151 | B1 * | 4/2001 | Manglapus et al. | 358/1.15 |
| 6,516,304 | B1 * | 2/2003 | Yoshimura | 705/52 |
| 6,618,566 | B2 | 9/2003 | Kujirai et al. | |
| 7,043,458 | B2 * | 5/2006 | Kimura | 705/400 |
| 7,426,048 | B2 * | 9/2008 | Sakai et al. | 358/1.14 |
| 7,571,126 | B2 * | 8/2009 | Nguyen et al. | 705/30 |
| 7,885,426 | B2 * | 2/2011 | Golovchinsky | 382/100 |
| 8,156,020 | B2 * | 4/2012 | Murayama et al. | 705/34 |
| 2001/0039498 | A1 * | 11/2001 | Kimura | 705/1 |
| 2003/0137682 | A1 * | 7/2003 | Sakai et al. | 358/1.13 |
| 2004/0117784 | A1 * | 6/2004 | Endoh | 717/169 |
| 2004/0263891 | A1 * | 12/2004 | Yamada et al. | 358/1.13 |
| 2005/0039091 | A1 * | 2/2005 | Hanaoka | 714/724 |
| 2005/0273403 | A1 * | 12/2005 | Nguyen et al. | 705/30 |
| 2005/0275867 | A1 * | 12/2005 | Higashiura et al. | 358/1.14 |
| 2006/0023243 | A1 * | 2/2006 | Asai | 358/1.13 |
| 2006/0026105 | A1 * | 2/2006 | Endoh | 705/59 |
| 2006/0044590 | A1 * | 3/2006 | Ferlitsch et al. | 358/1.14 |
| 2006/0109506 | A1 * | 5/2006 | Horiuchi et al. | 358/1.15 |
| 2008/0030769 | A1 * | 2/2008 | Hanaoka et al. | 358/1.15 |
| 2008/0075320 | A1 * | 3/2008 | Golovchinsky | 382/100 |
| 2008/0181651 | A1 * | 7/2008 | Takesada et al. | 399/82 |
| 2008/0263582 | A1 * | 10/2008 | Okamoto et al. | 725/29 |
| 2008/0306845 | A1 * | 12/2008 | Murayama et al. | 705/34 |
| 2009/0007130 | A1 * | 1/2009 | Sakai et al. | 718/104 |
| 2009/0086255 | A1 * | 4/2009 | Duong | 358/1.15 |
| 2009/0135451 | A1 * | 5/2009 | Ohno | 358/434 |

FOREIGN PATENT DOCUMENTS

| | | |
|---|---|---|
| JP | 2004-318225 | 11/2004 |
| JP | 2004-325490 | 11/2004 |
| JP | 2005-338378 | 12/2005 |

* cited by examiner

FIG.5

| APPARATUS SERIAL NUMBER | ⌐312 |
|---|---|
| APPLICATION IDENTIFICATION INFORMATION 1 | COUNT VALUE 1 |
| APPLICATION IDENTIFICATION INFORMATION 2 | COUNT VALUE 2 |
| APPLICATION IDENTIFICATION INFORMATION 3 | COUNT VALUE 3 |

⋮   ⋮

| CATEGORY INFORMATION | AREA INFORMATION |
|---|---|
| COMPANY A | COUNT VALUE STORAGE AREA 1212A |
| COMPANY B | COUNT VALUE STORAGE AREA 1212B |
| ⋮ | ⋮ |

| APPARATUS SERIAL NUMBER | ⌐1312 |
|---|---|
| CATEGORY INFORMATION 1 | COUNT VALUE 1 |
| CATEGORY INFORMATION 2 | COUNT VALUE 2 |
| CATEGORY INFORMATION 3 | COUNT VALUE 3 |

⋮   ⋮

CHARGE MANAGING SYSTEM, IMAGE FORMING APPARATUS, CHARGE MANAGING SERVER, AND IMAGE FORMING METHOD

CROSS-REFERENCE TO RELATED APPLICATION

The present application is a continuation application of U.S. application Ser. No. 12/123,737 filed May 20, 2008 now U.S. Pat. No 8,156,020, the entire contents of which are incorporated herein by reference. The '737 application claims priority to Japanese Application Nos. 2007-153317, filed Jun. 8, 2007; and 2007-153318, filed Jun. 8, 2007.

BACKGROUND OF THE INVENTION

1. Field of the Invention

The present invention relates to a charge managing system that manages charging a fee for using an image forming apparatus. The present invention also relates to an image forming apparatus, a charge managing server, an image forming method, and an image forming program used in such a charge managing system.

2. Description of the Related Art

Various charge systems are known for charging a fee for using an image forming apparatus with copying functions, fax functions, and/or scanning functions, for example. A charge system according to one example may be configured to count the number of printed sheets output from the image forming apparatus and determine the fee charged according to the number of printed sheets. It is noted that the fee charged for the use of an image forming apparatus may vary depending on various conditions such as the type of paper used. For example, the fee charged may vary depending on whether special paper dedicated for color copying is used or normal paper is used.

Japanese Laid-Open Patent No. 2005-338378 discloses an image forming apparatus that charges a fee generated for an image forming process and an authentication charge method.

According to techniques of the prior art, a fee for the use of an image forming apparatus may be charged based on the number of output sheets or the type of paper used. However, the fee cannot be adjusted in response to the use of a specific function of the image forming apparatus or the outputting of valuable information from the image forming apparatus, for example. In other words, the fee cannot be adjusted according to the function used or the value/type of information output by the image forming apparatus.

SUMMARY OF THE INVENTION

Aspects of the present invention are directed to providing a charge managing system that is capable of charging a fee for using an image forming apparatus according to the process executed by the image forming apparatus or the information output by the image forming apparatus. Other aspects of the present invention are directed to providing an image forming apparatus, a charge managing server, and an image forming method used in such a charge managing system.

According to one embodiment of the present invention, a charge managing system is provided that includes:

an image forming apparatus including a plurality of applications each configured for executing a specific process on input data, a counter unit that counts a number of result items output as a result of executing at least one of the applications, a count value storage unit that stores a count value corresponding to the number of result items counted by the counter unit, and a storage area setting unit that secures a plurality of storage areas within the count value storage unit each of which storage areas is configured for storing a corresponding count value obtained for each of the applications; and a charge managing server that manages charging a fee for using the image forming apparatus based on the corresponding count value stored in each of the storage areas secured for each of the applications.

According to another embodiment of the present invention, an image forming apparatus is provided that is connected to a charge managing server, the image forming apparatus including:

a plurality of applications each configured for executing a specific process on input data;

a counter unit that counts a number of result items output as a result of executing at least one of the applications;

a count value storage unit that stores a count value corresponding to the number of result items counted by the counter unit;

a storage area setting unit that secures a plurality of storage areas within the count value storage unit each of which storage areas is configured for storing a corresponding count value obtained for each of the applications; and a count value transmitting unit that transmits to the charge managing server the corresponding count value stored in each of the storage areas secured for each of the applications.

According to another embodiment of the present invention, a charge managing server is provided that is connected to an image forming apparatus and is configured to manage charging of a fee for using the image forming apparatus, the charge managing server including:

a count value acquiring unit that acquires from the image forming apparatus a plurality of count values each corresponding to a number of result items output as a result of executing each of a plurality of applications included in the image forming apparatus; and a charge unit that charges a fee for using the image forming apparatus based on each of the count values for each of the applications acquired by the count value acquiring unit.

According to another embodiment of the present invention, an image forming method is provided that is used by an image forming apparatus connected to a charge managing server which image forming apparatus includes a plurality of applications each configured for executing a specific process on input data and a count value storage unit for storing a count value of a number of result items output as a result of executing at least one of the applications, the image forming method including the steps of:

counting the number of result items individually with respect to execution of each of the applications;

securing a plurality of storage areas within the count value storage unit each of which storage areas is configured for storing a corresponding count value obtained for each of the applications; and transmitting to the charge managing server the corresponding count value stored in each of the storage areas secured for each of the applications.

According to another embodiment of the present invention, a charge managing system is provided that includes:

an image forming apparatus including a category information extracting unit that extracts category information from input data which category information is used for categorizing the input data into one of a plurality of different categories, a counter unit that counts output data individually with respect to each of the different categories and obtains an output data count value for each of the different categories, a count value storage unit that stores the output data count value obtained by the counter unit for each of the different categories, and an area determining unit that determines a storage area within the count value storage unit in which the output data count value obtained for each of the different categories is to be stored based on the extracted category information; and a charge managing server that manages charging of a fee for using the image forming apparatus based on the output data count value obtained for each of the different categories.

According to another embodiment of the present invention, an image forming apparatus connected to a charge managing server is provided, the image forming apparatus including:

a category information extracting unit that extracts category information from input data which category information is used for categorizing the input data into one of a plurality of different categories;

a counter unit that counts output data individually with respect to each of the different categories and obtains an output data count value for each of the different categories;

a count value storage unit that stores the output data count value obtained by the counter unit for each of the different categories; and an area determining unit that determines a storage area within the count value storage unit in which the output data count value obtained for each of the different categories is to be stored based on the extracted category information.

According to another embodiment of the present invention, a charge managing server is provided that is connected to an image forming apparatus and is configured to manage charging of a fee for using the image forming apparatus, the charge managing server including:

a count value acquiring unit that acquires from the image forming apparatus an output data count value obtained by individually counting output data of the image forming apparatus with respect to each of the different categories; and a charge unit that charges a fee based on the output data count value for each of the different categories acquired by the count value acquiring unit.

According to another embodiment of the present invention, an image forming method is provided that is used by an image forming apparatus connected to a charge managing server that manages charging of a fee for using the image forming apparatus, the image forming method including the steps of:

extracting category information from input data which category information is used for categorizing the input data into one of a plurality of different categories;

counting output data individually with respect to each of the different categories and obtaining an output data count value for each of the different categories;

storing the output data count value obtained by counting the output data with respect to each of the different categories; and determining a storage area in which the output data count value for each of the different categories is to be stored based on the category information.

Other objects, features and advantages of the present invention will become more apparent from the following detailed description when read in conjunction with the accompanying drawings.

BRIEF DESCRIPTION OF THE DRAWINGS

FIG. 5 is a table showing an exemplary configuration of a charge table stored in the charge managing server;

FIG. 13 is a table showing an exemplary configuration of a charge table included in a charge managing server of the charge managing system according to the second embodiment;

DETAILED DESCRIPTION OF THE PREFERRED EMBODIMENTS

In the following, preferred embodiments of the present invention are described with reference to the accompanying drawings.

(First Embodiment)

Figure 1:
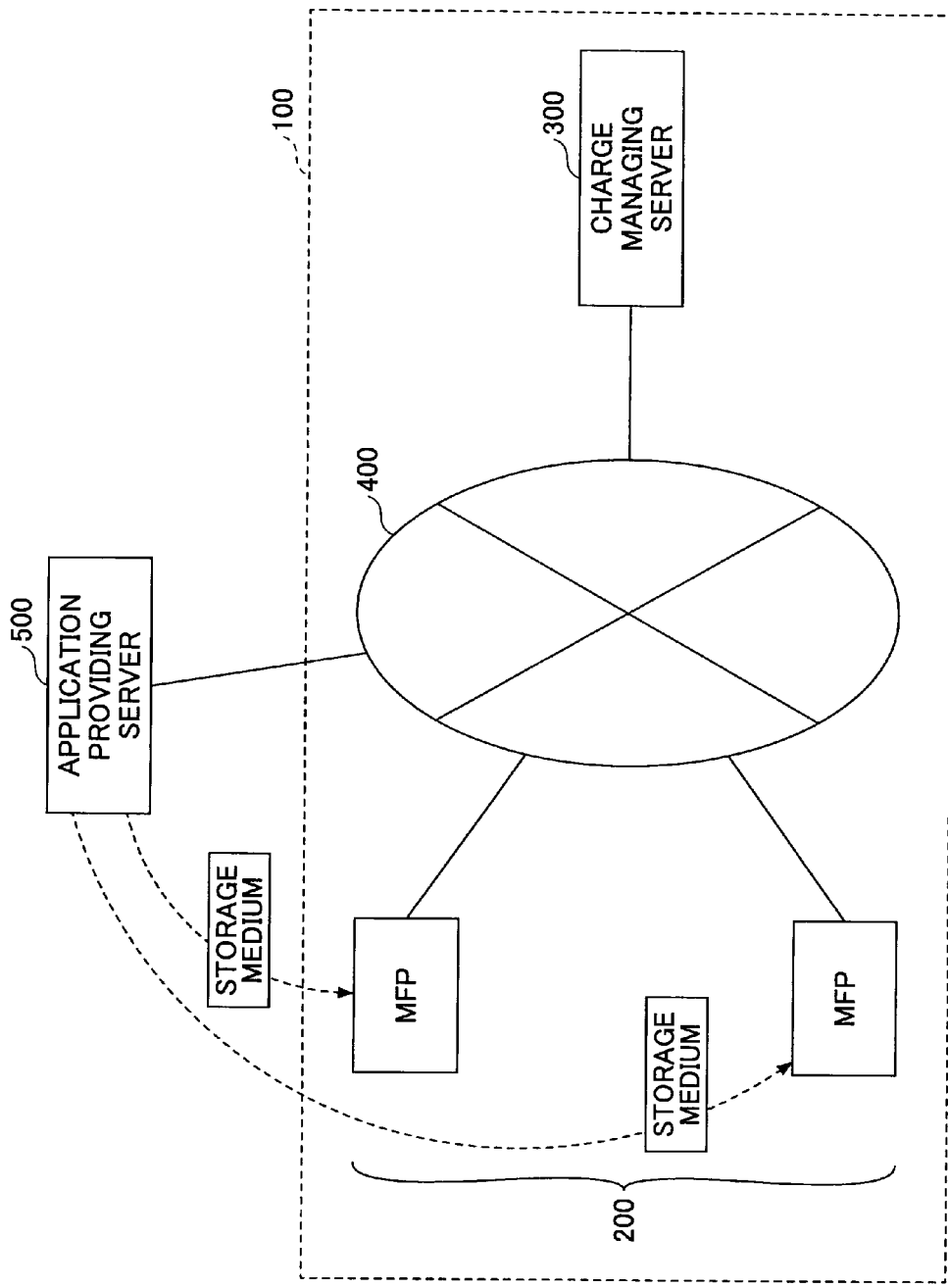
FIG. 1 is a diagram showing a configuration of a charge managing system according to a first embodiment of the present invention.

FIG. 1 is a diagram showing a configuration of a charge managing system according to a first embodiment of the present invention.

The illustrated charge managing system 100 according to the first embodiment includes an image forming apparatus 200 and a charge managing server 300 that are interconnected by a network 400. The network 400 is connected to an application providing server 500 that provides one or more applications to the image forming apparatus 200 as is described in detail below.

The image forming apparatus 200 acquires an application from the application providing server 500 via the network 400, and uses the acquired application to perform an image forming process. In one example, the image forming apparatus 200 may download an application from the application providing server 500. In another example, the image forming apparatus 200 may acquire an application from a storage medium storing one or more applications provided by the application providing apparatus 500.

In the charge managing system 100 according to the present embodiment, the image forming apparatus 200 counts the number of application execution result items output with respect to each individual application and stores the corresponding count value for each application. The charge managing server 300 uses the corresponding count value for each application to calculate a charged fee. For example, a price per unit result item for each application may be pre-registered in the charge managing server 300, and the charged fee may be calculated based on the pre-registered price information and the corresponding count value for each application.

In the above-described charge managing system 100 according to the present embodiment, a fee may be charged according to the process executed by the image forming apparatus 200 or the information output by the image forming apparatus 200, for example.

Figure 2:
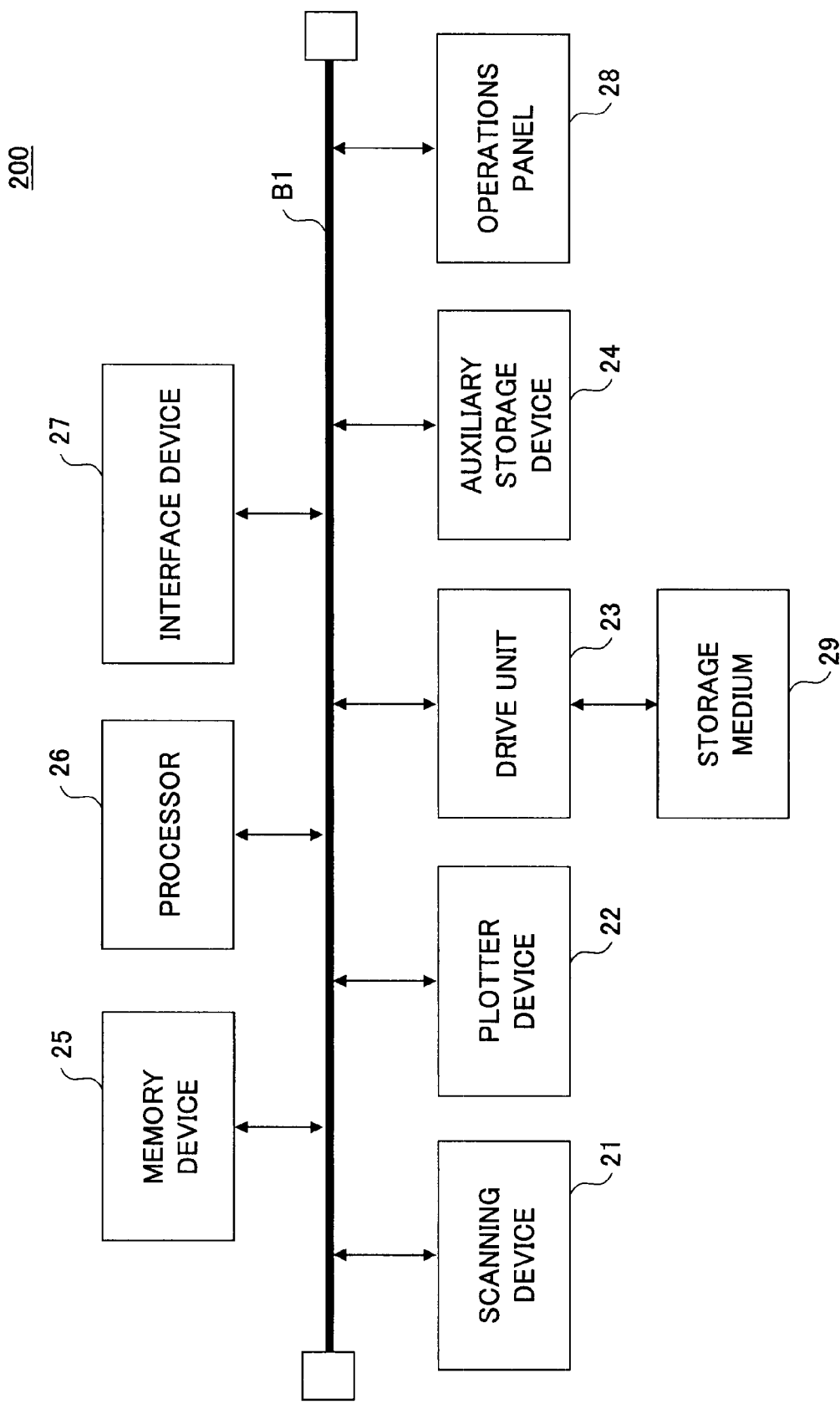
FIG. 2 is a block diagram showing an exemplary hardware configuration of an image forming apparatus included in the charge managing system according to the first embodiment.

FIG. 2 is a block diagram showing an exemplary hardware configuration of the image forming apparatus 200. According to FIG. 2, the image forming apparatus 200 includes a scanning device 21, a plotter device 22, a drive unit 23, an auxiliary storage device 24, a memory device 25, a processor 26, an interface device 27, and an operations panel 28 that are interconnected by a bus B1.

The scanning device 21 may include a scanner engine and an engine control unit, for example, and is configured to scan an image of a document and convert the scanned image into image data. The plotter device 22 may include a plotter engine and an engine control unit, for example, and is configured to print out the image data. The interface device 27 may include a modem and a LAN card, for example, and is used to establish connection with the network 400. The operations panel 28 is used for performing operations associated with a process executed by the image forming apparatus 200. The operations panel 28 may be a touch panel or some other type of device having display functions.

An image forming program according to an embodiment of the present invention may correspond to at least a portion of various programs for controlling the image forming apparatus 200. The image forming program may be installed in the image forming apparatus 200 from a storage medium 29 or downloaded via the network 400, for example. The storage medium 29 for storing the image forming program may be any one of various types of storage media, such as a CD-ROM, a flexible disk, a magneto-optic disk, or some other type of recording medium that stores information optically, electrically, or magnetically; or a semiconductor memory such as a ROM or a flash memory that stores information electrically.

When the storage medium 29 on which the image forming program is recorded is set to the drive unit 23, the image forming program stored in the storage medium 29 may be installed in the auxiliary storage device 24 via the drive unit 23. In the case of downloading the image forming program via the network 400, the image forming program may be installed in the auxiliary storage device 24 via the interface device 27.

The image forming apparatus 200 is configured to store the installed image forming program as well as necessary files and data. The memory device 25 reads and stores the image forming program installed in the auxiliary storage device 24 when the image forming apparatus 200 is activated. The processor 26 controls various functions of the image forming apparatus 200 to execute various processes as described in detail below.

Figure 3:
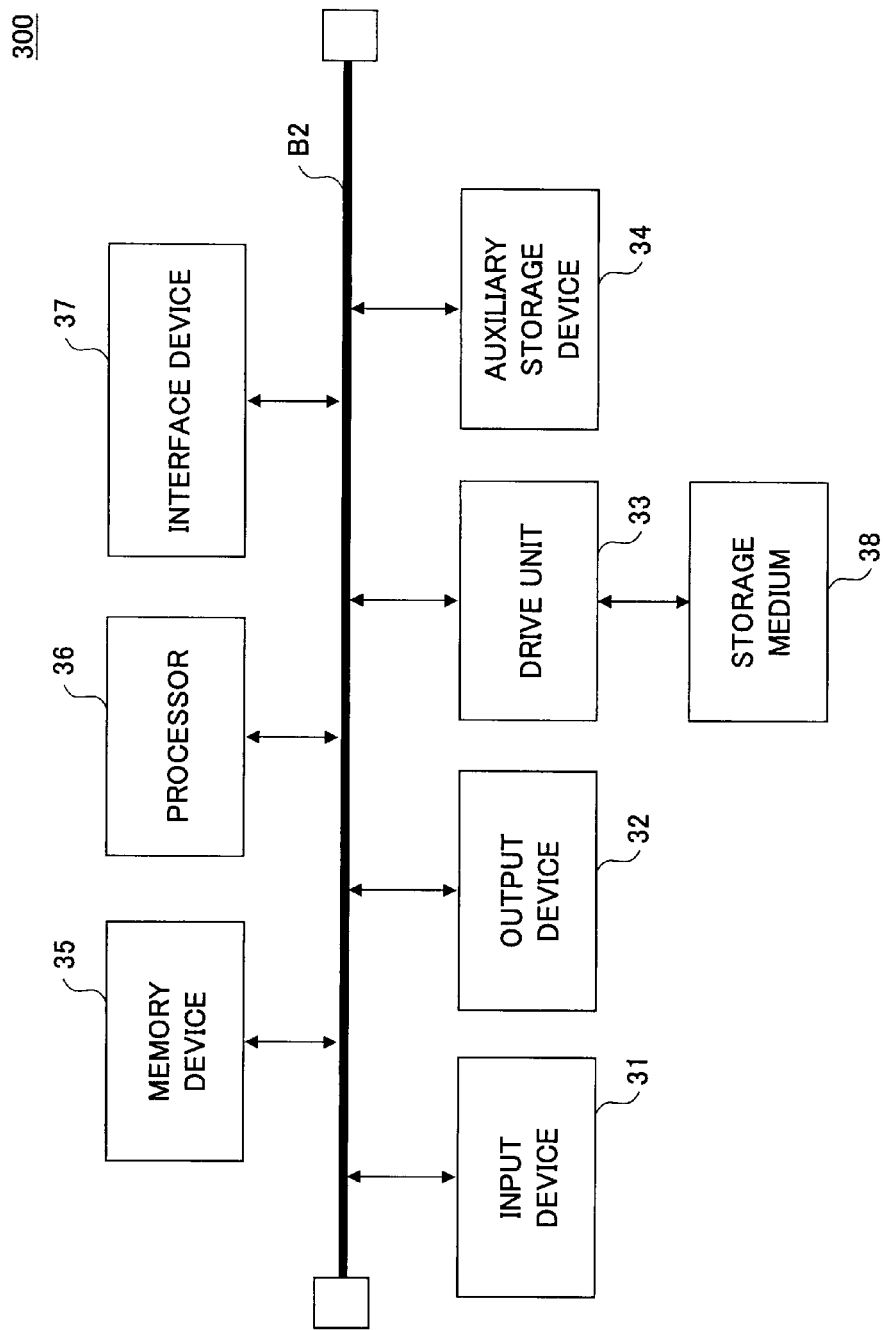
FIG. 3 is a block diagram showing an exemplary hardware configuration of a charge managing server included in the charge managing system according to the first embodiment.

FIG. 3 is a block diagram showing a hardware configuration of the charge managing server 300. According to FIG. 3, the charge managing server 300 includes an input device 31, an output device 32, a drive unit 33, an auxiliary storage device 34, a memory device 35, a processor 36, and an interface device 37 that are interconnected by a bus B2.

The input device 31 may include a keyboard and a mouse, for example, and is used for inputting various signals. The output device 32 may include a display device, for example, and is used for displaying various windows and data. The interface device 37 may include a modem and a LAN, for example, and is used for establishing connection with the network 400.

A charge managing program according to an embodiment of the present invention may correspond to at least a portion of various programs for controlling the charge managing server. The charge managing program may be installed in the charge managing server 300 from a storage medium 38 or downloaded via the network 400, for example. The storage medium 38 for storing the charge managing program may be any one of various types of storage media, such as a CD-ROM, a flexible disk, a magneto-optic disk, or some other type of recording medium that stores information optically, electrically, or magnetically; or a semiconductor memory such as a ROM or a flash memory that stores information electrically.

When the storage medium 38 on which the charge managing program is recorded is set to the drive unit 33, the charge managing program stored in the storage medium 38 may be installed in the auxiliary storage device 34 via the drive unit 33. In the case of downloading the charge managing program via the network 400, the charge managing program may be installed in the auxiliary storage device 34 via the interface device 37.

The charge managing server 300 is configured to store the installed image forming program as well as necessary files and data. The memory device 35 reads and stores the image forming program installed in the auxiliary storage device 34 when the charge managing server 300 is activated. The processor 36 controls various functions of the charge managing server 300 to execute various processes as described in detail below.

In the following the charge managing system according to the present embodiment is described in greater detail with reference to FIG. 4.

Figure 4:
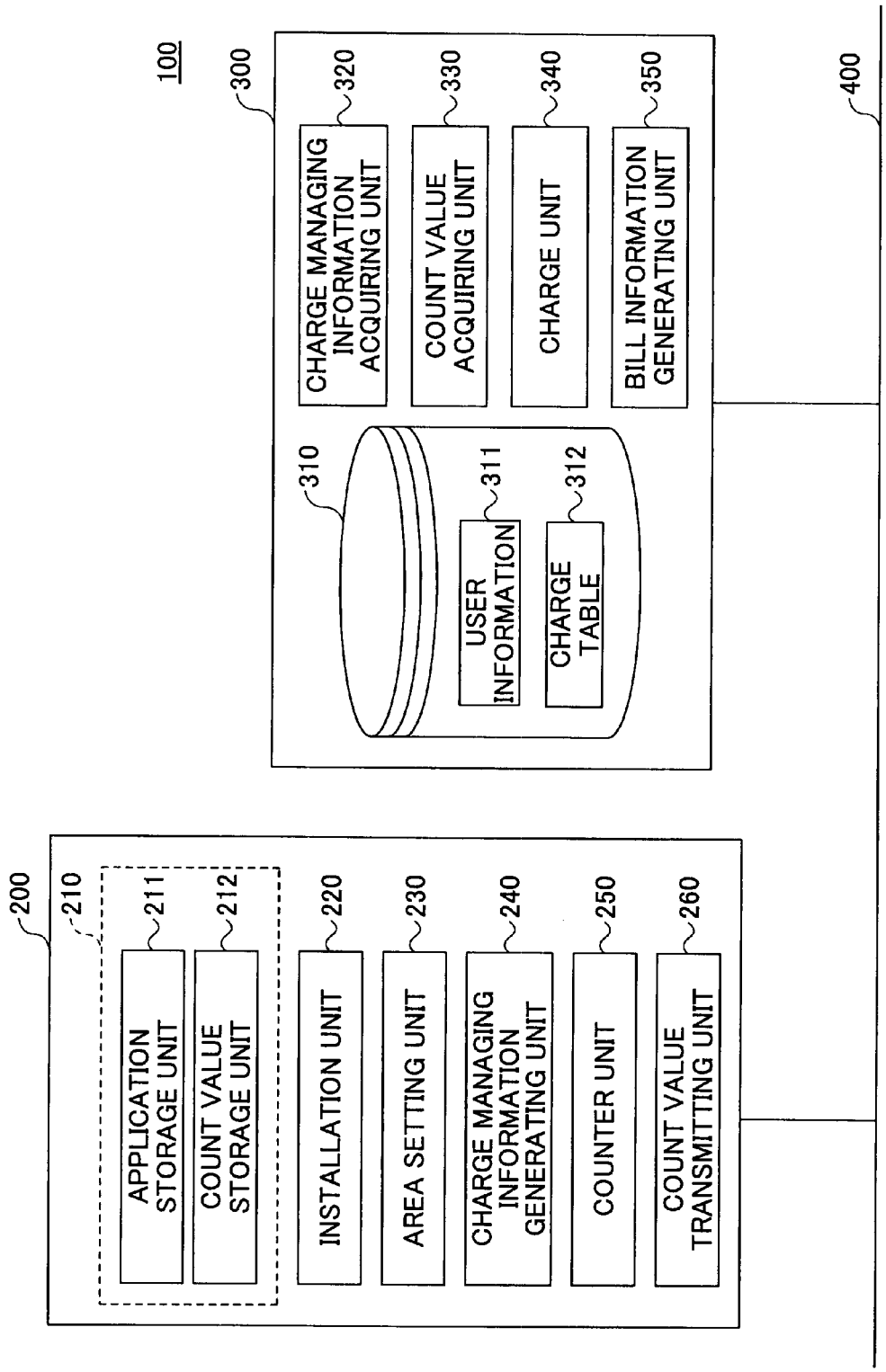
FIG. 4 is a diagram showing functional configurations of apparatuses included in the charge managing system according to the first embodiment.

FIG. 4 is a diagram showing functional configurations of the apparatuses included in the charge managing system 100 according to the present embodiment.

First, the functional configuration of the image forming apparatus 200 is described below.

The image forming apparatus 200 secures a count value storage area within the memory device 25 for storing a corresponding count value for each application. Each time processing results of executing an application are output, the image forming apparatus 200 counts the number of application execution result items that are output and updates a corresponding count value stored in the count value storage area.

According to FIG. 4, the image forming apparatus 200 includes a storage unit 210, an installation unit 220, an area setting unit 230, a charge managing information generating unit 240, a counter unit 250, and a count value transmitting unit 260.

The storage unit 210 is a part of the memory device 25 and includes an application storage unit 211 and a count value storage unit 212. The application storage unit 211 stores plural applications used by the image forming apparatus 200, and the count value storage unit 212 stores a corresponding count value for each of the applications stored in the application storage unit 211.

In the following, an application according to an embodiment of the present invention is described.

The application according to the present embodiment is a program having a specific function that is installed in the image forming apparatus 200 and is configured to execute a specific process on data that are input to the image forming apparatus 200. The application may be read from the application storage unit 211 and executed by the processor 26 so that the specific function of the application may be activated. It is noted that the application of the present embodiment may be installed in the image forming apparatus 200 beforehand, or the application may be acquired from the application providing server 500, for example.

The specific function of the application used in the present embodiment may correspond to a function of determining whether input data has copyright and implementing preventive measures against unauthorized copying upon outputting (e.g., printing) the input data if the input data has copyright, for example.

In the following, functional features of the application of the present embodiment are described in greater detail. In one example, the application according to the present embodiment may include a book number determining function for determining whether a given set of input data includes a book number used for universal identification of a book (publication) and a background pattern embedding function for embedding a background pattern to prevent the printed output of the input data from unauthorized copying. In this case, the application may be configured to have the background pattern embedding function perform a process of embedding a background pattern into input data when the book number determining function determines that a book number is included the input data. It is noted that the book number may be an ISBN (International Standard Book Number), for example.

Further, the application according to the present embodiment may include a layout adjusting function for printing out the input data in a predetermined layout, and a finishing process function for performing a predetermined finishing process on the printout, for example. In this case, the application may be configured to have the layout adjusting function print the input data in the predetermined layout and have the finishing process perform the predetermined finishing process on the printout when the book number determining function determines that a book number is included the input data, for example. It is noted that the predetermined finishing process may be a stapling process or a hole-punching process, for example.

The input data subject to processing in the present embodiment may be image data acquired by scanning a paper document using the scanning device 21, or image data downloaded by the image forming apparatus 200 from an external information delivering server (not shown) connected to the network 400, for example. Also, although the application according to the above-described embodiment is configured to output the input data through printing, the method of outputting the input data is not limited to printing. For example, an application according to another embodiment may be configured to perform a specific process on the input data and transfer the resulting processed input data as an output result item to another apparatus connected to the network 400.

In the present embodiment, an application performs a specific process on input data of the image forming apparatus 200 and outputs the resulting information as a result item. The result item may be output according to the output method implemented by the application being executed to generate this result item. For example, if the output method implemented by the application is printing, the result item may correspond to a printed item. In another example, if the output method implemented by the application is data transfer, the result item may correspond to processed data output after the application performs a specific process on the input data.

It is noted that the specific function of the application according to an embodiment of the present invention is not limited to those described above. For example, an application according to another embodiment may have a function of assigning specific time/date information to input data and authenticating the existence of the input electronic data and its tamper-free status, for example.

The installation unit 220 is used for installing an application acquired by the image forming apparatus 200. For example, the installation unit 220 may store the acquired application in the application storage unit 211.

The area setting unit 230 is used for securing a count value storage area within the count value storage unit 212 for storing a corresponding count value for each application.

The charge managing information generating unit 240 generates charge managing information for enabling charge management within the charge managing server 300. Specifically, the charge managing information generating unit 240 generates charge managing information which associates information identifying the image forming apparatus 200, information identifying the installed application, and a count value stored in a corresponding count value storage area secured for the application. It is noted that the charge managing information generating unit 240 may generate charge managing information including count value information stored in a corresponding count value storage area that is set to an initial value of 0 (zero), for example.

In one embodiment, the information identifying the image forming apparatus 200 may be an apparatus serial number assigned to the image forming apparatus 200. The information identifying the application may be text data representing the name of the application, for example. In one embodiment, the application installed in the image forming apparatus 200 may already include identification information for identifying this application. In this case, the charge managing information generating unit 240 may generate the charge managing information by extracting the identification information identifying the application from the installed application. The charge managing information generated by the charge managing information generating unit 240 is transmitted to the charge managing server 300 to be stored in a charge table.

The counter unit 250 counts the number of result items that are output and updates the corresponding count value information stored in the count value storage unit 212. The count value transmitting unit 26 transmits an updated count value to the charge managing server 300 when a count value stored in the count value storage unit 212 is updated.

In the following the charge managing server 300 is described in detail.

According to FIG. 4 the charge managing server 300 includes a user database 310, a charge managing information acquiring unit 320, a count value acquiring unit 330, a charge unit 340, and a bill information generating unit 350.

The user database 310 stores user information 311 in association with a charge table 312. The user information 311 includes information pertaining to users of the charge managing system 100 according to the present embodiment. Specifically, the user information 311 may include information items such as the apparatus serial number of the image forming apparatus 200, the user name, billing destination information, and total amount information. The charge table 312 stores the charge managing information generated by the charge managing information generating unit 240 of the image forming apparatus 200. Specifically, identification information of the image forming apparatus 200, identification information of applications, and corresponding count values for the applications are stored in association with each other in the charge table 312. FIG. 5 is a table showing an exemplary configuration of the charge table 312.

The charge managing information acquiring unit 320 acquires charge managing information from the image forming apparatus 200, and stores the acquired information in the charge table 312. The count value acquiring unit 330 acquires the count value transmitted from the count value transmitting unit 260 of the image forming apparatus 200 and updates the count value stored in the charge table 312. The charge unit 340 calculates a fee to be charged based on the charge table 312. The bill information generating unit 350 generates information related to a bill for the charged fee calculated by the charge unit 340.

In the following, a process performed by the area setting unit 230 for securing a count value storage area is described with reference to FIG. 6.

Figure 6:
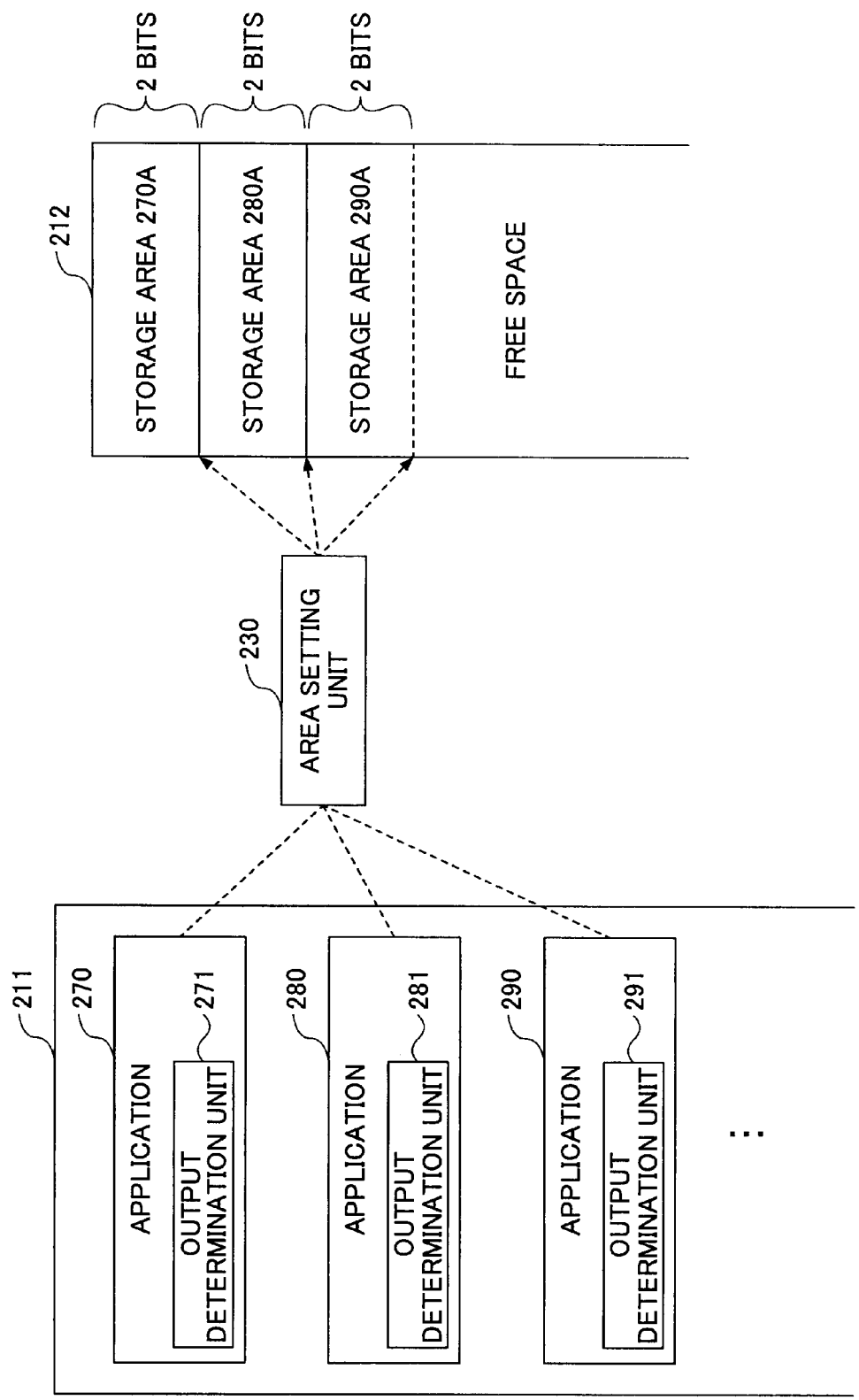
FIG. 6 is a diagram showing how a count value storage area is set by an area setting unit of the image forming apparatus.

FIG. 6 is a diagram showing how the area setting unit 230 secures a count value storage area for an application.

According to the present embodiment, when an application is installed in the image forming apparatus 200 by the installation unit 220, the area setting unit 230 secures a count value storage area for the installed application within the count value storage unit 212. It is noted that the count value storage unit 212 used in the present embodiment may be a nonvolatile memory such as a NVRAM (Non Volatile Random Access Memory), for example.

According to the present embodiment, information may be stored at a desired location by assigning an address at which the information is to be stored within the count value storage unit 212. For example, an area from the head bit to the second bit of the free space of the count value storage unit 212 may be secured as the storage area for storing a first count value, an area from the third bit to the fourth bit may be secures as a storage area for storing a second count value, and so forth.

In one embodiment, the area setting unit 230 may be configured to secure an area of two bits starting from the head of the current free space of the count value storage unit 212 each time an application is installed in the image forming apparatus 200 by the installation unit 220 so that the secured area may be used as the count value storage area for storing the corresponding count value for the installed application. In the following descriptions, an application is assumed to be installed in the image forming apparatus 200 when it is stored in the application storage unit 211.

The process performed by the area setting unit 230 is described in detail below with reference to FIG. 6. When an application 270 is stored in the application storage unit 211 by the installation unit 220, the area setting unit 230 secures an area of two bits within the count value storage unit 212 starting from the head of the current free space of the count value storage unit 212 as a count value storage area 270A for storing the corresponding count value for the installed application 270.

When another application 280 is installed in the application storage unit 211, the area setting unit 230 secures an area of two bits starting from the head of the current free space (i.e., end of the count value storage area 270A) of the count value storage unit 212 as a count value storage area 280A for storing the corresponding count value for the installed application 280.

When another application 290 is installed in the application storage unit 211, the area setting unit 230 secures an area of two bits starting from the head of the current free space (i.e., end of the count value storage area 280A) of the count value storage unit 212 as a count value storage area 290A for storing the corresponding count value for the installed application 290.

As can be appreciated from the above descriptions, in the present embodiment, the area setting unit 230 dynamically secures a new count value storage area within the count value storage unit 212 each time an application is installed in the application storage unit 211 so that a count value area for storing a corresponding count value for each installed application may be secured within the application storage unit 211. Thus, in the image forming apparatus 200 according to the present embodiment, the number of result items obtained with respect to each application that is installed may be counted. In the charge managing system 100 according to the present embodiment, a charge process may be individually performed with respect to the result items obtained for each application.

Also, in FIG. 6, the applications 270, 280, and 290 installed in the image forming apparatus 200 include output determination units 271, 281, and 291, respectively. It is noted that the output determination units 271, 281, and 291 have identical functions so that the output determination unit 271 of the application 270 is described below as a representative example.

The output determination unit 271 determines whether outputting of result items resulting from executing a process by the application 270 has been completed. Specifically, in the case where the result items correspond to printed sheets, the output determination unit 271 may determine that outputting of the result items has been completed when printed sheets are discharged from the plotter device 22. In the case where the result items correspond to processed data, the output determination unit 271 may determine that outputting of the result items has been completed when the processed data are transmitted to an external apparatus via the interface device 27. In the image forming apparatus 200 according to the present embodiment, when the determination unit 271 of the application 270 determines that outputting of the result items has been completed, the counter unit 250 counts the output result items.

By configuring an application installed in the image forming apparatus 200 to have such a determination unit as is described above, cases may be prevented in which result items are counted before outputting of the result items are completed, for example.

In the following, operations of the charge managing system 100 according to the present embodiment are described.

Specifically, a charge table generating process, a charge table updating process, and a charge process are described below with reference to FIGS. 7, 8, and 9.

Figure 7:
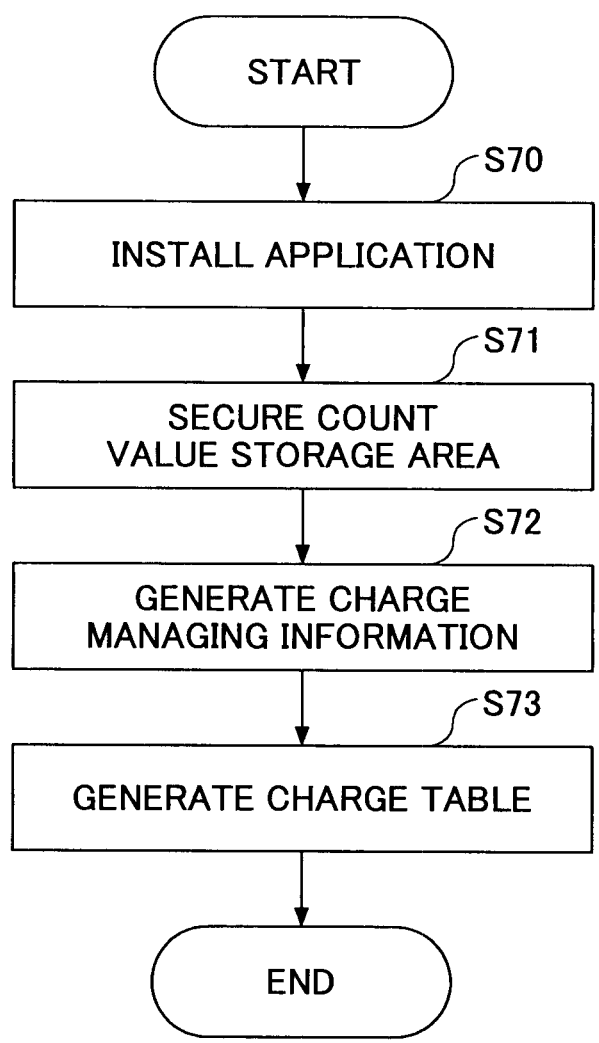
FIG. 7 is a flowchart illustrating a charge table generating process performed in the charge managing system according to the first embodiment.

FIG. 7 is a flowchart illustrating a process for generating the charge table 312 of the charge managing system 100.

In the charge managing system 100, the charge managing server 300 generates the charge table 312 based on charge managing information generated when an application (e.g., application 270) is installed in the image forming apparatus 200.

According to FIG. 7, for example, when the installation unit 220 installs the application 270 in step S70, the process moves on to step S71 where the area setting unit 230 secures the count value storage area 270A for the application 270 within the count value storage unit 212. Then, the process moves on to step S72 where the charge managing information generating unit 240 generates charge managing information.

The charge managing information generating unit 240 generates charge managing information that includes the apparatus serial number of the image forming apparatus 200, the application identification information of the application 270, an initial value of the count value stored in the count value storage area 270A, and transmits the generated information to the charge managing server 300.

Then, in step S73, the charge managing information acquiring unit 320 of the charge managing server 300 acquires the charge managing information transmitted from the image forming apparatus 200. The acquired charge managing information is stored in the user database 310 as the charge table 312 which is associated with the user information 311.

In the following, a process of updating the charge table 312 in the charge managing system 100 according to the present embodiment is described.

Figure 8:
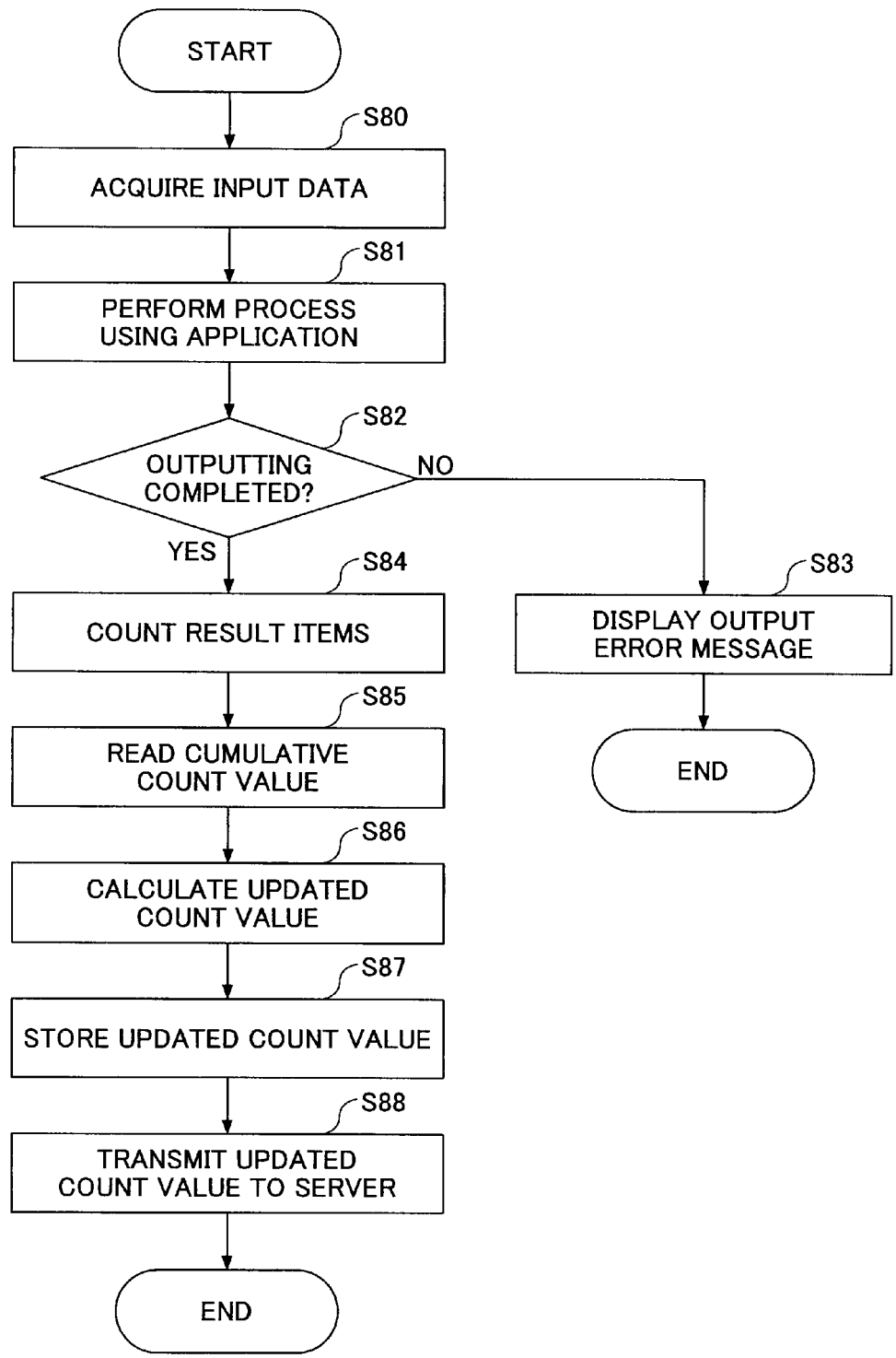
FIG. 8 is a flowchart illustrating a charge table updating process performed in the charge managing system according to the first embodiment.
Figure 9:
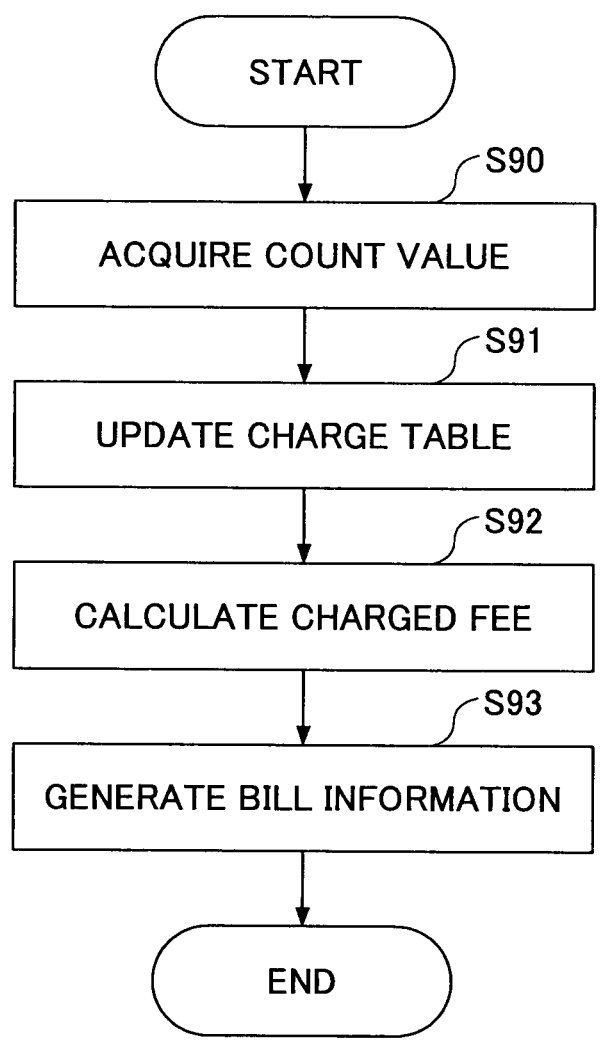
FIG. 9 is a flowchart illustrating a charge process performed by the charge managing server.

FIG. 8 is a flowchart illustrating process steps for updating the charge table 312 in the charge managing system 100 according to the present embodiment.

According to FIG. 8, for example, when the image forming apparatus 200 acquires input data in step S80, the process moves on to step S81 where an application such as the application 270 is executed and a predetermined process is performed on the input data. The application 270 executed in this example may correspond to a function selected via the operations panel 28 of the image forming apparatus 200, for example.

Then, the process moves on to step S82 where the output determination unit 271 of the application 270 determines whether outputting of the result items resulting from the process performed on the input data has been completed. If it is determined in step S82 that outputting of the result items is not completed, the process moves on to step S83 where the application 270 has the operations panel 28 display an output error message or some other type of indication that the relevant process has not been completed.

On the other hand, if the output determination unit 271 determines in step S82 that outputting of the result items has been completed, the process moves on to step S84 where the counter unit 250 counts the result items. In one embodiment, the counter unit 250 may temporarily store the count value obtained in step S84 in the memory device 25, for example.

In one example where the result items correspond to printed sheets, the counter unit 250 counts the number of printed sheets output by the plotter device 22. In another example where the result items correspond to processed data, the counter unit 250 counts the units of information output from the interface device 27. Specifically, in this case, the image forming apparatus 200 may divide the information to be output into predetermined information units, and the counter unit 250 may be configured to count the number of information units output via the interface unit 27, for example.

After step S84, the process moves on to step S85 where the counter unit 250 reads the corresponding count value for the application 270 stored in the count value storage area 270A from the count value storage unit 212. It is noted that the count value read in this case corresponds to a cumulative value of count values of result items obtained by executing the application 270.

After step S85, the process moves on to step S86 where the counter unit 250 calculates a new count value by adding the count value obtained in step S84 to the count value read out in step S85 and updates the cumulative value of the count values obtained with respect to the execution of the application 270. After step S86, the process moves on to step S87 where the counter unit 250 stores the updated count value obtained in step S86 in the count value storage area 270A.

In response to the updating of the count value stored in the count value storage area 270A in step S87, the process moves on to step S88 where the count value transmitting unit 260 transmits the updated count value and the apparatus serial number of the image forming apparatus 200 to the charge managing server 300.

In the following, a charge process performed by the charge managing server 300 according to the present embodiment is described.

When the updated count value is transmitted from the image forming apparatus 200, the count value acquiring unit 330 of the charge managing server 300 acquires the updated count value in step S90. Then, in step S91, the charge unit 340 updates the count value stored in the charge table 312 based on the count value acquired by the count value acquiring unit 330.

Then, in step S92, the charge unit 340 calculates a total amount to be charged based on the information stored in the table 312. The process of calculating the total amount by the charge unit 340 is described below.

In one embodiment, unit price information indicating the price per result item for each type of application may be stored in the user database 310 of the charge managing server 300. In this case, the charge unit 340 acquires from the charge managing information stored in the charge table 312 the corresponding unit price information for the application 270 and the corresponding count value for the application 270 to calculate the total amount to be charged for the result items obtained by executing the application 270.

It is noted that in certain preferred embodiments of the present invention, the unit price information indicating the price per result item for each application may be specified depending on the process performed by the relevant application or the value of the input data processed by the relevant application. Specifically, for example, in a case where the application 270 is configured to be executed to perform a specific process on input data having copyright, the unit price information for the result item obtained by executing the application 270 preferably includes the price of the content (information) of the input data and the price for using the application 270.

As can be appreciated from the above descriptions, according to an aspect of the present invention, the unit price for a result item obtained by executing an application may be set according to the type of information processed by the application, and the number of result items output may be counted with respect to each individual application. In this way, a fee may be appropriately charged according to the process executed by the image forming apparatus 200 and the information output by the image forming apparatus 200.

After step S92, the process moves on to step S93 where the bill information generating unit 350 of the charge managing server 300 generates bill information indicating the fee charged. Specifically, based on the charge managing information, the bill information generating unit 350 acquires user information including the billing destination to which the fee is to be charged, for example. Then, the bill information generating unit 350 generates the bill information indicating the fee charged in association with the acquired user information.

In one preferred embodiment, the charge managing server 300 may be configured to generate the bill information in the form of a file. In another preferred embodiment, the charge managing server 300 may be configured to transmit the generated bill information to a user terminal connected to the network 400 based on the acquired user information.

As can be appreciated from the above descriptions, in the charge managing system 100 according to an embodiment of the present invention, a fee to be charged for output result items may be calculated with respect to each individual application that is executed. Thus, according to an aspect of the present invention, a fee may be charged according to the process performed by the image forming apparatus 200 or the information output by the image forming apparatus 200, for example.

Also, according to another aspect of the present invention, by configuring the image forming apparatus 200 of the charge managing system 100 to determine whether outputting of result items obtained by executing of an application has been completed before counting the result items, the count value stored in the count value storage unit may be prevented from being updated when output error occurs. That is, a case may be prevented in which a fee is charged even when the result items are not actually output.

Also, according to another aspect of the present invention, by configuring the image forming apparatus 200 of the charge managing system 100 to dynamically secure a corresponding count value storage area each time an application is installed, one or more of the above-described advantageous effects of the present invention may be achieved by installing an application in the image forming apparatus 100. Also, by dynamically defining the count value storage area, the corresponding count value for each application may be retained even when a hard disk storing information such as log information of the image forming apparatus 200 is damaged, for example.

According to another aspect of the present invention, by configuring the charge managing system 100 to charge a fee including both the price for using an application and the price for the information contents of input data, the charge system may be simplified and there may be no need for the application providing side and the input data (information contents) providing side to individually implement a charge system, for example.

(Second Embodiment)

In the following, a charge managing system 1100 according to a second embodiment of the present invention is described.

Figure 10:
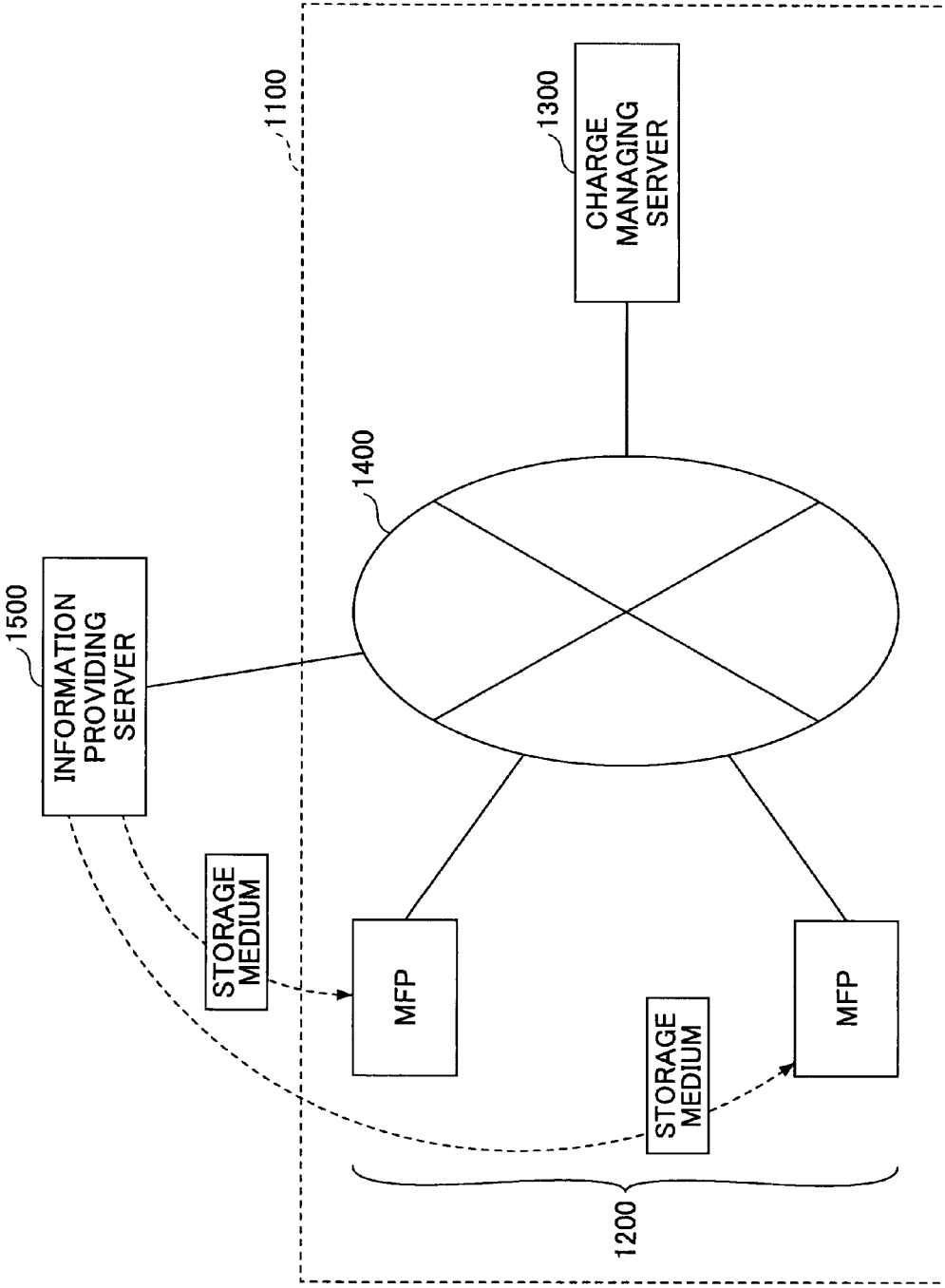
FIG. 10 is a diagram showing a configuration of a charge managing system according to a second embodiment of the present invention.

FIG. 10 is a diagram showing a configuration of the charge managing system 1100 according to the second embodiment.

The illustrated charge managing system 1100 according to the second embodiment includes an image forming apparatus 1200 and a charge managing server 1300 that are interconnected by a network 1400. The network 1400 is connected to an information providing server 1500 that provides information to the image forming apparatus 1200 as is described in detail below.

The image forming apparatus 1200 may download information from the information providing server 1500 as input data that are to be output, for example. Also, the image forming apparatus 1200 may acquire information from a storage medium that stores information provided by the information providing server 1500 as input data to be output, for example.

In the charge managing system 1100 according to the present embodiment, the image forming apparatus 1200 categorizes input data (information) that are input thereto. Also, upon outputting the input data, the image forming apparatus 1200 counts the number of sets of output data for each individual category. The charge managing server 1300 uses the corresponding count value of output data for each category to calculate a charged fee. For example, a price per unit data for each category may be pre-registered in the charge managing server 1300, and the charged fee may be calculated based on the pre-registered price information and the corresponding count value for each category.

In the above-described charge managing system 1100 according to the present embodiment, a fee may be charged according to the type of information or the value of information output by the image forming apparatus 1200, for example.

It is noted that the image forming apparatus 1200 and the charge managing server 1300 may have hardware configurations that are identical to those of the image forming apparatus 200 and the charge managing server 300 used in the first embodiment as shown in FIGS. 2 and 3 so that descriptions thereof are hereby omitted.

Figure 11:
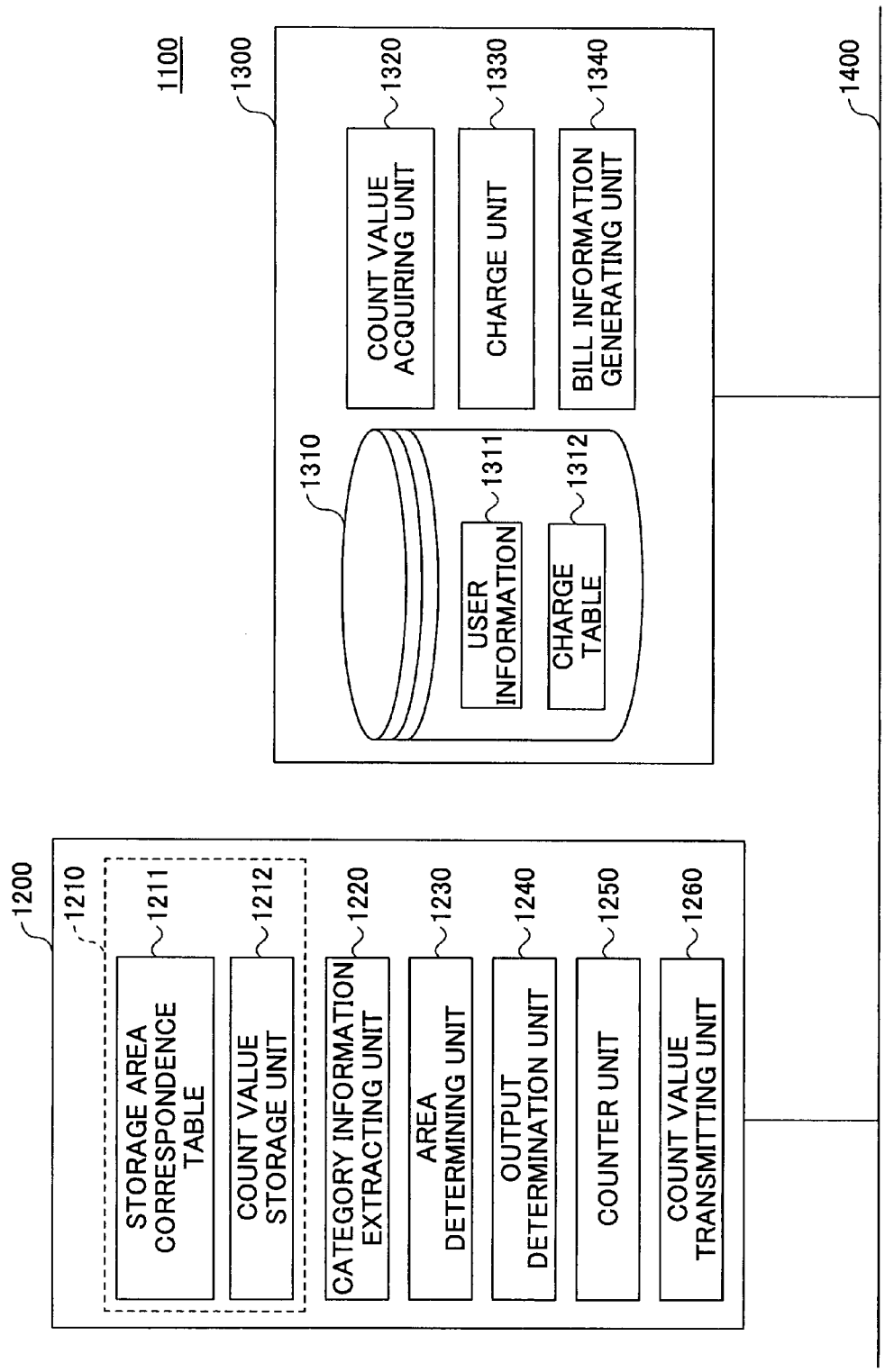
FIG. 11 is a diagram showing functional configurations of apparatuses included in the charge managing system according to the second embodiment.

FIG. 11 is a diagram showing functional configurations of the image forming apparatus 1200 and the charge managing server 1300 of the charge managing system 1100 according to the second embodiment.

First, the image forming apparatus 1200 is described below.

When the image forming apparatus 1200 according to the present embodiment acquires input data, it extracts from the acquired input data category information for categorizing the input data. Upon outputting the acquired input data, the image forming apparatus 1200 counts the number of sets of output data for each individual category based on the extracted category information. The corresponding count value for each category may be stored in a corresponding count value storage area that is associated with the corresponding category information.

As is shown in FIG. 11, the image forming apparatus 1200 according to the present embodiment includes a storage unit 1210, a category information extracting unit 1220, an area determining unit 1230, an output determination unit 1240, a counter unit 1250, and a count value transmitting unit 1260.

The storage unit 1210 is a part of the memory device 25 and includes a storage area correspondence table 1211 and a count value storage unit 212. The storage area correspondence table 1211 may store information that is pre-registered by a system administrator of the present charge managing system 1100, for example. Specifically, the information stored in the storage area correspondence table 1211 may include category information and information indicating the storage area of a corresponding count value for each set of category information. The count value storage unit 1212 stores the corresponding count value for each set of category information.

The category information extracting unit 1220 extracts from input data acquired by the image forming apparatus 1200 category information for categorizing the input data. It is noted that the input data acquired by the image forming apparatus 1200 may correspond to image data obtained by reading a document with the scanning device 21 or information downloaded fro the information providing server 1500, for example.

In the following, category information used in the present embodiment is described.

In the present embodiment, category information may correspond to information indicating the type of the input data acquired by the image forming apparatus 1200, information pertaining to the value of the input data, or information indicating the distribution source of the input data, for example. Specifically, in the case where the category information corresponds to information indicating the type of the input data, the category information may indicate the data format of the input data, such as PDF file format, text format, or image data format.

In the case where the category information corresponds to information pertaining to the value of the input data, the category information may correspond to information on the copyright of the input data or the degree of confidentiality of the input data, provided that such information is included in the input data. It is noted that information on the copyright of the input data may be represented by an ISBN (International Standard Book Number) or an author name, for example. Also, information indicating the degree of confidentiality of the input data may be represented by a time stamp assigned to the input data, for example.

In the case where the category information corresponds to information indicating the distribution source of the input data, the category information may be represented by the name or IP address of the information providing server 1500 corresponding to the downloading source of the input data, for example. Also, in the case where the input data are acquired by the scanner 21, the category information may be represented by the name of an organization distributing the information included in the input data, for example.

The area determining unit 1230 determines a count value storage area within the count value storage unit 1212 that stores a corresponding count value for the category information extracted by the category information extracting unit 1220 based on the storage area correspondence table 1211.

The output determination unit 1240 determines whether outputting of the output data has been completed. In the present embodiment, input data acquired by the image forming apparatus 1200 are processed and output as output data. It is noted that the output data may be in various forms depending on the process performed within the image forming apparatus 1200. For example, if the process performed within the image forming apparatus 1200 corresponds to a printing process, the output data may correspond to printed matter. In another example, if the process performed within the image forming apparatus 1200 corresponds to an image data transferring process, the output data may correspond to transmission data that are transmitted to an external apparatus.

In the case where the output data correspond to printed matter, the output determination unit 1240 may determine whether printed sheets have been output from the plotter device 22, for example. In the case where the output data correspond to transmission data that are transmitted to an external apparatus, the output determination unit 1240 may determine whether the transmission destination apparatus has received the transmission data.

The counter unit 1250 obtains a count value for output data in each category and updates a corresponding count value stored in the count value storage unit 1212. When a count value stored in the count value storage unit 1212 is updated, the count value transmitting unit 1260 transmits the updated count value to the charge managing server 1300.

In the following, the storage area correspondence table 212 and the count value storage unit 212 are described.

Figures 12A, 12B:
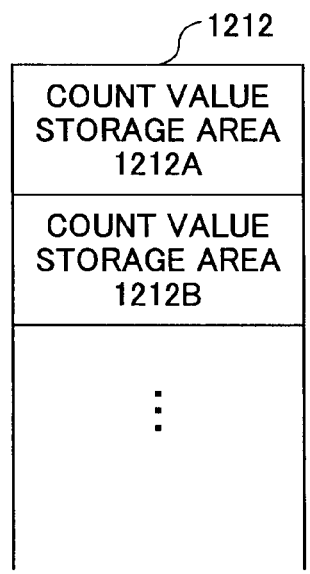
FIGS. 12A and 12B are diagrams respectively showing exemplary configurations of a count value storage unit and a storage area correspondence table included in an image forming apparatus of the charge managing system according to the second embodiment.

FIG. 12A is a diagram showing an exemplary configuration of the count value storage unit 1212, and FIG. 12B is a table showing an exemplary configuration of the storage area correspondence table 1211.

In the present embodiment, plural count value storage areas (e.g., count value storage areas 1212A and 1212B in FIG. 12A) are secured within the count value storage unit 1212 of the image forming apparatus 1200. The count value storage unit 1212 may be a nonvolatile memory such as a NVRAM (Non Volatile Random Access Memory), for example.

The storage area correspondence table 1211 of FIG. 12B includes category information and area information indicating the count value storage area storing the corresponding count value for each set of category information. It is noted that the area information indicating the count value storage area storing the corresponding count value for each set of category information may be address information of the count value storage area secured for each set of category information within the count value storage unit 1212.

In the storage area correspondence table 1211 of FIG. 12B, the category information indicates the distribution source of input data. According to the example of FIG. 12B, in the case where category information indicating Company A as the distribution source is extracted from input data, the count value of output data corresponding to such input data is stored in the count value storage area 1212A of the count value storage unit 1212 upon outputting the input data. In the case where category information indicating Company B as the distribution source is extracted from input data, the count value of output data corresponding to such input data is stored in the count value storage area 1212B of the count value storage unit 1212.

Referring back to FIG. 11, the charge managing server 1300 of the present embodiment is described below.

The charge managing server 1300 according to the present embodiment includes a user database 1310, a count value acquiring unit 1320, a charge unit 1330, and a bill information generating unit 1340.

The user database 1310 stores user information 1311 and a charge table 1312 in association with each other. The user information 1311 includes information related to a user of the charge managing system 1100, such as the apparatus serial number identifying the image forming apparatus 1200 being used by the user, the user name, billing destination information for the charged fee, and information on the total amount charged. The charge table 1312 may include identification information such as the apparatus serial number of the image forming apparatus 1200, category information, and a corresponding count value for each set of category information that are associated with each other. FIG. 13 is a table showing an exemplary configuration of the charge table 1312.

The count value acquiring unit 1320 acquires the count value transmitted from the count value transmitting unit 1260 of the image forming apparatus 1200 and updates a corresponding count value stored in the charge table 1312. The charge unit 1330 calculates the fee charged based on the charge table 1312. the bill information generating unit generates bill information pertaining to the charged fee calculated by the charge unit 1330.

In the following, operations of the charge managing system 1100 according to the present embodiment and a charge process performed by the charge managing server 1300 are described with reference to FIGS. 14 and 15.

Figure 14:
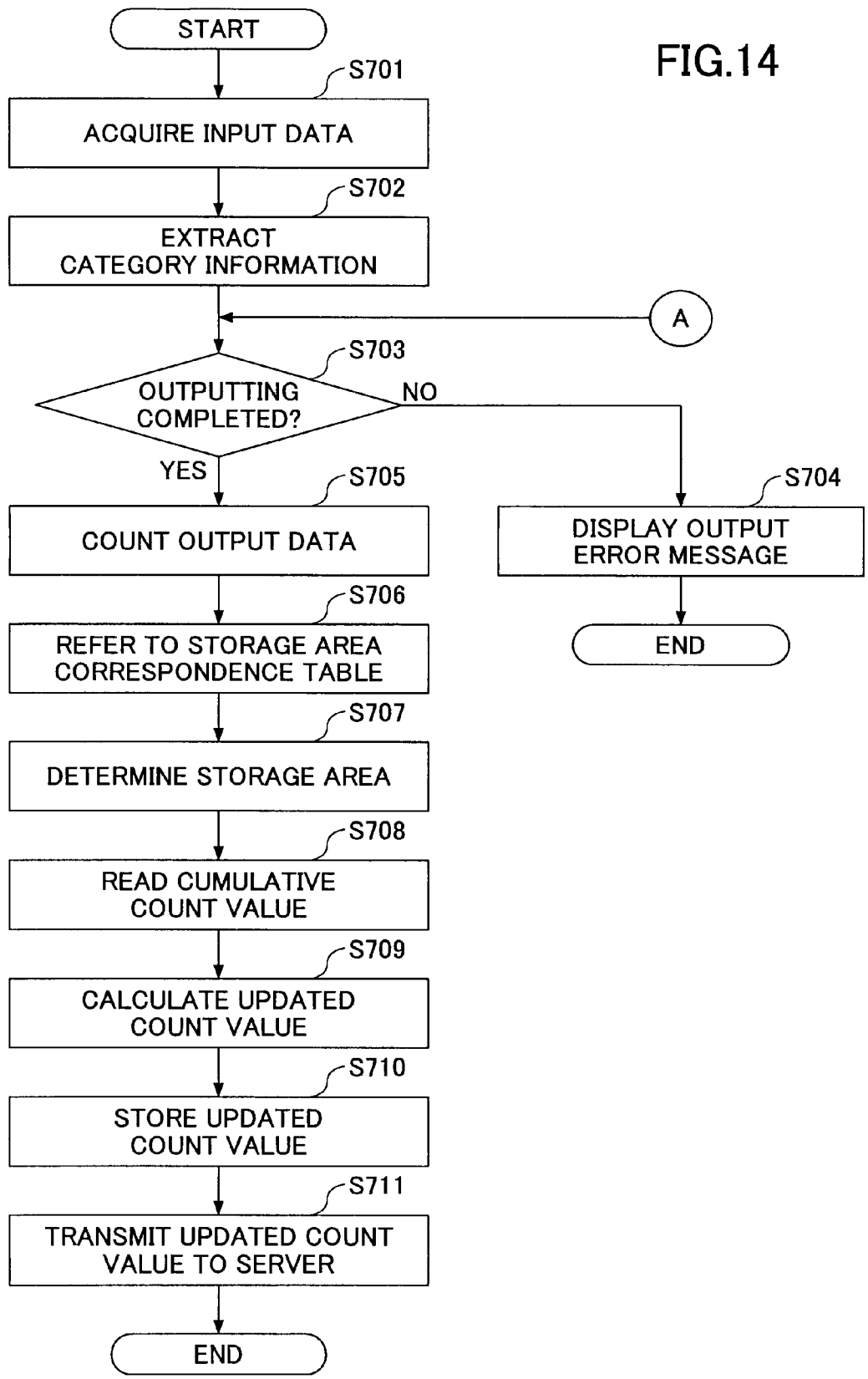
FIG. 14 is a flowchart illustrating operations of the charge managing system according to the second embodiment.
Figure 15:
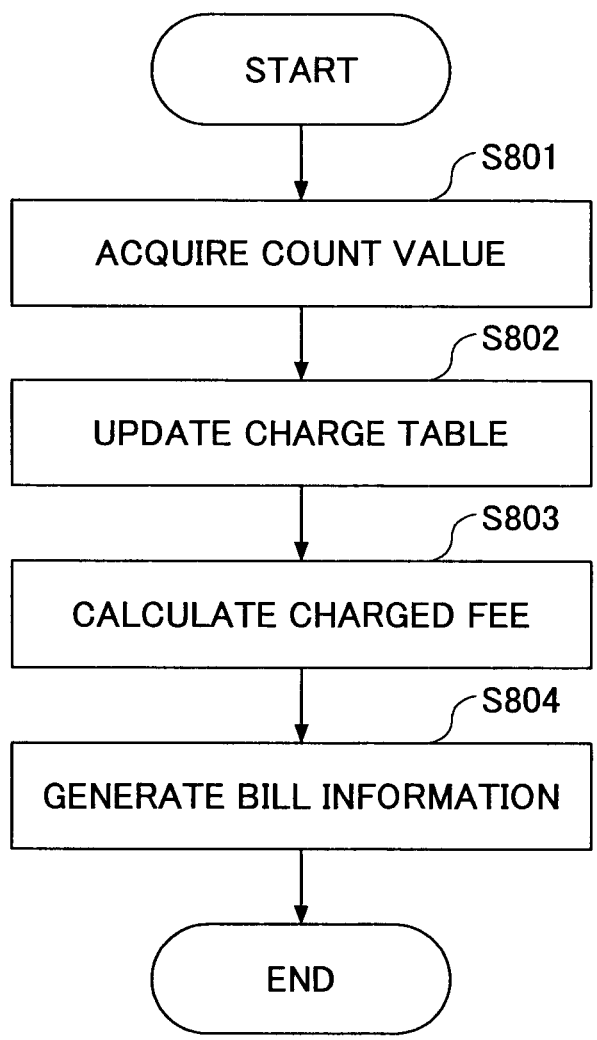
FIG. 15 is a flowchart illustrating a charge process performed by the charge managing server of the charge managing system according to the second embodiment.

FIG. 14 is a flowchart illustrating operations of the charge managing system 1100 according to the second embodiment of the present invention. FIG. 15 is a flowchart illustrating a charge process performed by the charge managing server 1300 of the second embodiment.

As is shown in FIG. 14, when the image forming apparatus 1200 acquires input data in step S701, the process moves on to step S702 where the category information extracting unit 1220 extracts category information from the input data. In one preferred embodiment, a number of different ways of categorizing information may be pre-registered as candidate category information to be extracted from the input data. In a further embodiment, the image forming apparatus 1200 may be configured to enable selection of a desired type of information to be extracted as category information. For example, in a case where input data are desirably categorized according to their distribution source, information indicating the distribution source of input data may be selected as the category information to be extracted from the input data. In a case where input data are desirably categorized according to their data format, information indicating the data format of input data may be selected as the category information to be extracted from the input data.

After step S702, the process moves on to step S703 where the output determination unit 1240 determines whether a predetermined process has been performed on the input data and outputting of the resulting processed data (output data) has been completed. If it is determined in step S703 that outputting of the output data has not been completed, the process moves on to step S703 where the output determination unit 1240 displays a message indicating output error on the operations panel 28, for example.

If it is determined in step S703 by the output determination unit 1240 that outputting of the output data has been completed, the process moves on to step S705 where the counter unit 1250 counts the output data. It is noted that the counter unit 1250 temporarily stores the count value obtained in step S705 in a memory such as the memory device 25.

In one example where the output data correspond to printed matter, the counter unit 1250 may count the number of printed sheets that are output. In another example where the output data correspond to transmission data that are transmitted to an external apparatus, the counter unit 1250 may determine the amount of information output from the interface device 27. In this case, the transmission data may be divided into predetermined data units upon being output, and the counter unit 1250 may count the number of data units of the transmission data, for example.

After step S705, the process moves on to step S706 where the area determining unit 1230 refers to the storage area correspondence table 1211. Then, in step S707, the area determining unit 1230 determines from the storage area correspondence table 1211 the count value storage area storing the corresponding count value for the category information extracted in step S702.

In the following, a counting process performed by the counter unit 1250 is described in an exemplary case where the category information extracted in step S702 indicates Company A as the distribution source and the count value storage area 212A is determined to be the storage area storing the corresponding count value for the extracted category information in step S707.

After step S707, the process moves on to step S708 where the counter unit 1250 reads the count value stored in the count value storage area 1212A. In the present example, the count value read in step S708 corresponds to a cumulative value of count values obtained with respect to output data categorized as being distributed by Company A.

After step S708, the process moves on to step S709 where the counter unit 1250 calculates a new count value by adding the count value obtained in step S705 that is temporarily stored in a memory to the count value read in step S708. Then, in step S710, the counter unit 1250 stores the new count value calculated in step S709 in the count value storage area 212A as an updated count value.

After step S710, the process moves on to step S711 where the count value transmitting unit 1260, in response to the updating of the count value stored in the count value storage area 212A, transmits the updated count value along with the apparatus serial number of the image forming apparatus 1200 to the charge managing server 300.

In the following, a charge process performed by the charge managing server 300 is described with reference to FIG. 15.

When the updated count value and the apparatus serial number of the image forming apparatus 1200 are transmitted from the image forming apparatus 1200, the count value acquiring unit 1320 of the charge managing server 1300 acquires the updated count value and the apparatus serial number of the image forming apparatus 1200 in step S801. Then, in step S802, the charge unit 1330 updates a corresponding count value stored in the charge table 1312 according to the count value and the apparatus serial number of the image forming apparatus 1200 acquired by the count value acquiring unit 1320.

After step S802, the process moves on to step S803 where the charge unit 1330 refers to the charge table 1312 to calculate the charged fee.

In the following, a charge process performed by the charge unit 1330 is described.

In one embodiment, price information for each set of category information indicating a unit price for output data in each category may be stored in the user database 1310 of the charge managing server 1300. In this case, the charge unit 1330 may acquire the price information for each set of category information and the count value for each set of category information stored in the charge table 1312 to calculate a fee charged for output data corresponding to each set of category information.

After step S803, the process moves on to step S804 where the bill information generating unit 1340 of the charge managing server 1300 generates bill information pertaining to the fee charged for the output data. Specifically, based on the apparatus serial number stored in the charge table 1312 and the user information 1311 stored in the user database 1310, the bill information generating unit 1340 acquires user information of the user corresponding to the billing destination of the fee charged. Then, the bill information generating unit 1340 generates information associating the charged fee with the acquired user information as bill information.

It is noted that in one preferred embodiment, the charge managing server 1300 may be configured to generate a bill file as the bill information. In another embodiment, the charge managing server 1300 may be configured to transmit the generated bill information to a corresponding user terminal connected to the network 1400 based on the acquired user information.

As can be appreciated from the above descriptions, in the charge managing system 1100 according to the second embodiment, information acquired by the image forming apparatus 1200 (input data) may be categorized and a fee for the information (output data) may be individually calculated with respect to each category into which the information is categorized. In this way, a fee for information output from the image forming apparatus 1200 may be appropriately charged according to the type or value of information output by the image forming apparatus 1200, for example.

Also, in the present embodiment, a counting process is performed on output data after a determination is made as to whether outputting of the output data has been completed so that a count value may be prevented from being updated when output error occurs, for example. In this way, a case may be prevented in which a fee is charged even when output data are not actually output, for example.

Also, in the present embodiment, a count value storage area is secured within a nonvolatile memory so that a count value corresponding to each set of category information may be retained even when a hard disk storing information such as log information of the image forming apparatus 1200 is damaged, for example.

(Third Embodiment)

In the following, a charge managing system according to a third embodiment of the present invention is described with reference to FIGS. 16-18. It is noted that the overall system configuration of the charge managing system according to the third embodiment may be substantially identical to that of the second embodiment as shown in FIG. 10. The charge managing system according to the third embodiment differs from that of the second embodiment in that it includes functional features for setting a new count value storage area upon determining that there is no corresponding count value storage area secured within the count value storage unit for category information that is extracted. It is noted that other functional features of the charge managing system according to the third embodiment that are identical to those of the second embodiment are given the same reference numbers and their descriptions are omitted.

Figure 16:
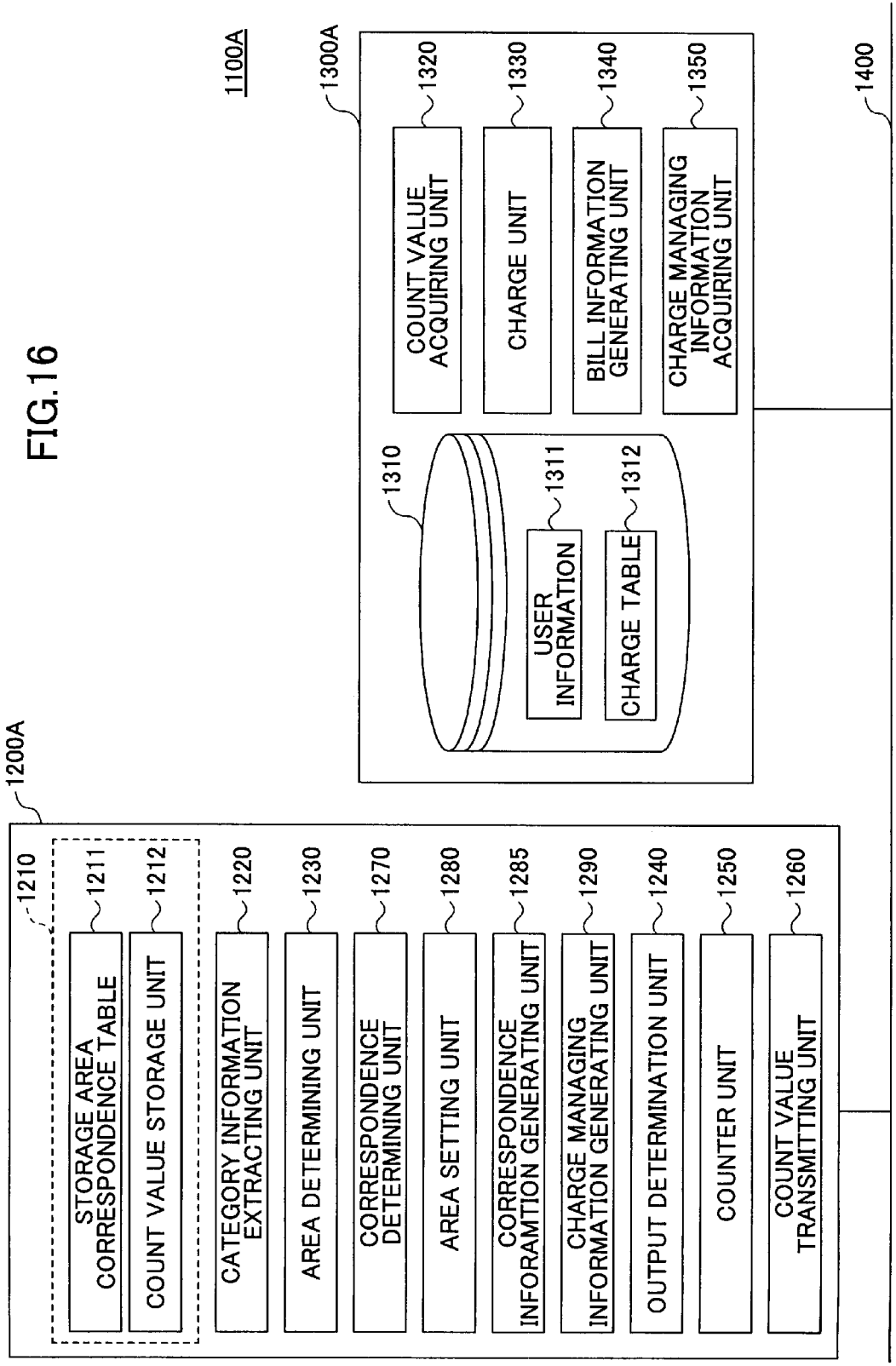
FIG. 16 is a diagram showing functional configurations of apparatuses included in a charge managing system according to a third embodiment of the present invention.

FIG. 16 is a diagram showing functional configurations of apparatuses included in the charge managing system according to the third embodiment. The illustrated charge managing system 1100A according to the third embodiment includes an image forming apparatus 1200A and a charge managing server 1300A that are interconnected by a network 1400.

The image forming apparatus 1200A includes a correspondence determining unit 1270, an area setting unit 1280, a correspondence information generating unit 1285, and a charge managing information generating unit 1290 in addition to the functional units included in the image forming apparatus 1200 of the second embodiment.

The correspondence determining unit 1270 determines whether category information extracted from input data by the category information extracting unit 1220 is registered in the storage area correspondence table 1211. Specifically, the correspondence determining unit 1270 determines whether a corresponding count value storage area is secured within the count value storage unit 1212 for the category information extracted by the category information extracting unit 1220.

When the correspondence determining unit 1270 determines that there is no corresponding count value storage area secured within the count value storage unit 1212 for the extracted category information, the area setting unit 1280 secures a new count value storage area within the count value storage unit 1212 as the corresponding count value storage area for the extracted category information.

After the area setting unit 1280 secures the new count value storage area within the count value storage unit 1212, the correspondence information generating unit 1285 generates correspondence information indicating the correspondence between the extracted category information and the new count value storage area secured by the area setting unit 1280. Then, the correspondence information generating unit 1285 stores the generated correspondence information in the storage area correspondence table 1211 and updates the storage area correspondence table 1211.

After the correspondence information is generated, the charge managing information generating unit 1290 generates charge managing information including the apparatus serial number of the image forming apparatus 1200A, the category information included in the generated correspondence information, and an initial value of the count value to be stored in the new count value storage area. It is noted that the initial value of the count value to be stored in the new count value storage area may be zero, for example. Then, the charge managing information generating unit 1290 transmits the generated charge managing information to the charge managing server 1300A.

The charge managing server 1300A according to the present embodiment includes a charge managing information acquiring unit 1350 in addition to the functional units included in the charge managing server 1300 according to the second embodiment.

The charge managing information acquiring unit 1350 acquires charge managing information transmitted from the image forming apparatus 1200A, stores the acquired charge managing information in the charge table 1312 to update the charge table 1312.

In the following, a process performed by the area setting unit 1280 for securing a new count value storage area is described in detail with reference to FIG. 17.

Figure 17:
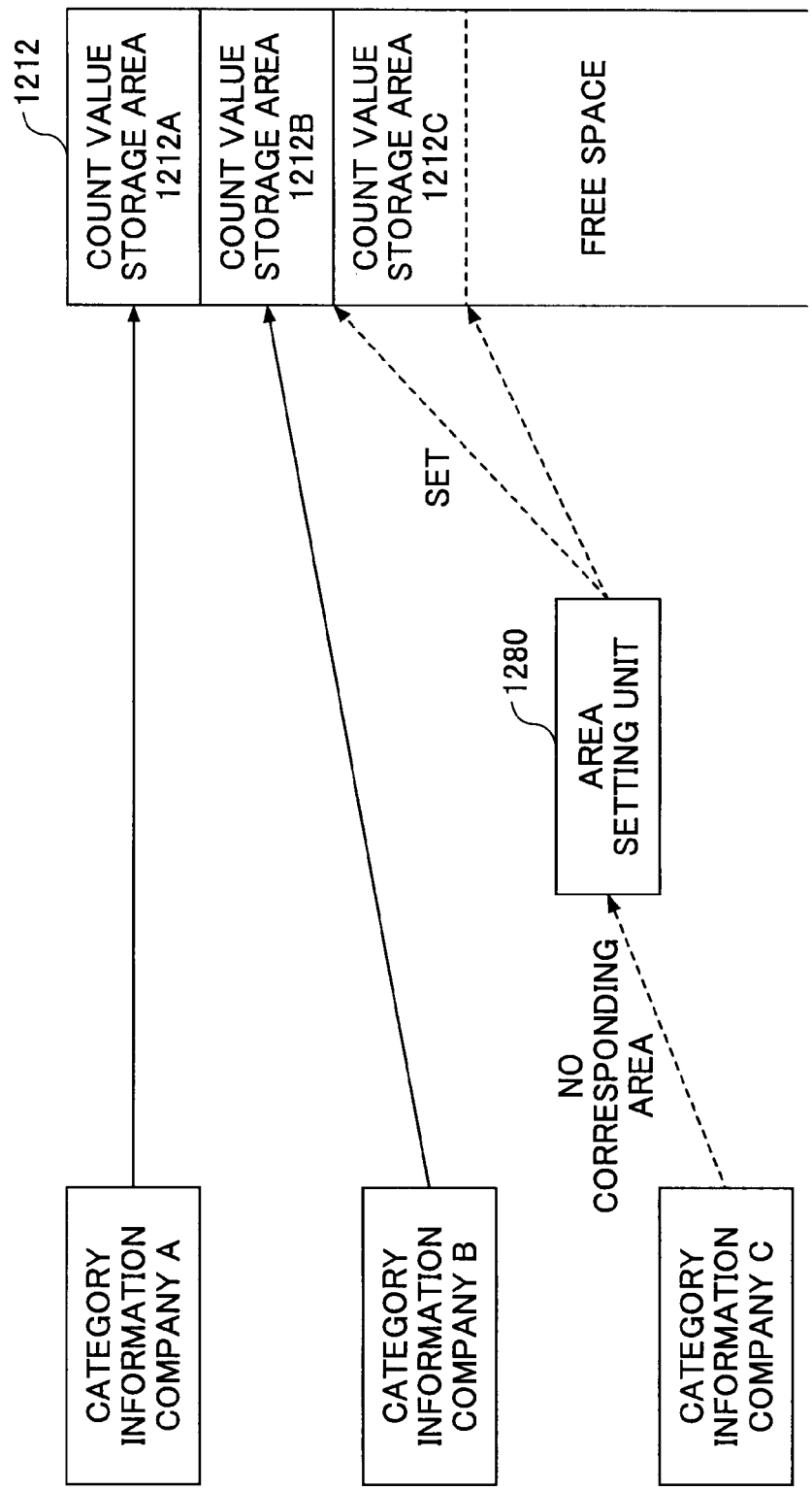
FIG. 17 is a diagram showing how an area setting unit secures a count value storage area in the charge managing system according to the third embodiment.

FIG. 17 is a diagram showing how the area setting unit 1280 secures (sets) a new count value storage area within the count value storage unit 1212.

In one preferred embodiment, the count value storage unit 1212 may be a nonvolatile memory such as a NVRAM (Non Volatile Random Access Memory). In this case, information may be stored at a desired location of the count value storage unit 1212 by assigning an address (storage area) for storing the information within the count value storage unit 1212. For example, the first two bits from the head bit to the second bit of the free space of the count value storage unit 1212 may be secured (set) as a storage area for storing a first count value, the third bit to the fourth bit of the free space may be secured (set) as a storage area for storing a second count value, and so forth so that a storage area for storing each of differing types of information may be secured (set) within the count value storage unit 1212.

When the correspondence determining unit 1270 determines that there is no corresponding count value storage area secured (set) for the extracted category information, the area setting unit 1280 secures (sets) a certain area such as the first two bits from the head bit to the second bit of the current free space of the count value storage unit 1212 as the corresponding count value storage area for the extracted category information.

In the following, the process performed by the area setting unit 1280 is specifically described in relation to an exemplary case where the image forming apparatus 1200A stores the storage area correspondence table 1211 as shown in FIG. 12B.

The illustrated storage area correspondence table 1211 of FIG. 12B stores category information of Company A and category information of Company B in association with count value storage area 1212A and count value storage area 1212B, respectively. In this case, the count value storage unit 1212 of the image forming apparatus 1200A is configured to store a count value corresponding to the category information of Company A in the count value storage area 1212A and a count value corresponding to the category information of Company B in the count value storage area 1212B.

In the present example, when the category information extracted by the category information extracting unit 1220 corresponds to category information of Company C, the correspondence determining unit 1270 determines that category information of Company C is not registered in the area correspondence table 1211 so that there is no corresponding count value storage area secured within the count value storage unit 1212 for the category information of Company C.

When the correspondence determining unit 1270 makes such a determination, the area setting unit 1280 secures a certain area such as the first two bits from the head bit to the second bit of the current free space of the count value storage unit 1212 as a corresponding count value storage area 1212C for the category information of Company C. Once the corresponding count value storage area 1212C for the category information of Company C is secured within the count value storage unit 1212, the image forming apparatus 1200A may store a corresponding count value for the category information of Company C in the count value storage area 1212C upon extracting category information of Company C from input data acquired thereafter.

In the following, operations of the charge managing system 1100A according to the present embodiment are described with reference to FIG. 18.

Figure 18:
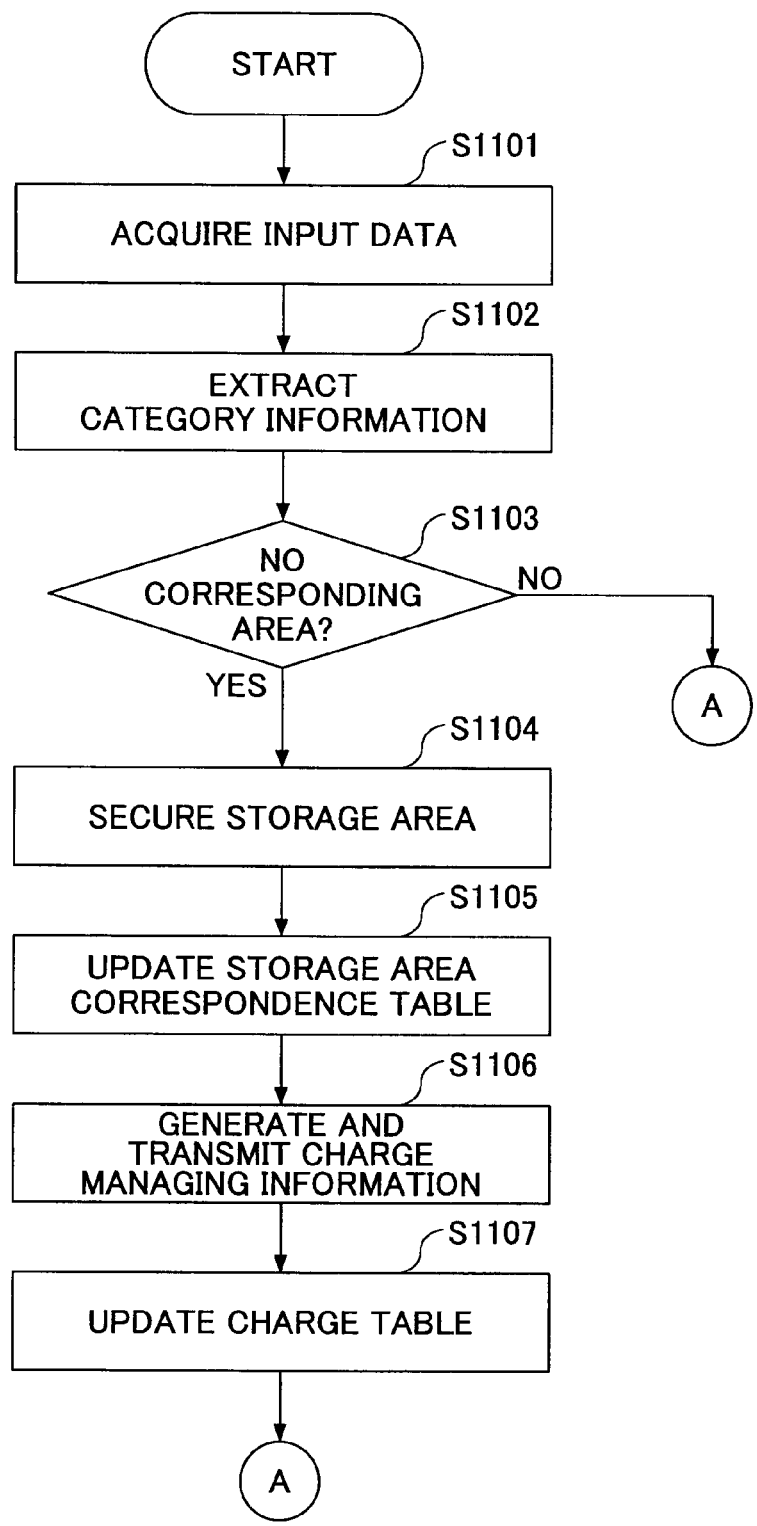
FIG. 18 is a flowchart illustrating operations of the charge managing system according to the third embodiment.

FIG. 18 is a flowchart illustrating the operations of the charge managing system 1100A according to the third embodiment.

According to FIG. 18, when the image forming apparatus 1200A acquires input data in step S1101, the process moves on to step S1102 where the category information extracting unit 1220 extracts category information from the acquired input data. Then, in step S1103, the correspondence determining unit 1270 refers to the storage area correspondence table 1211 to determine whether there is a corresponding count value storage area secured within the count value storage unit 1212 for the extracted category information.

If it is determined in step S1103 that there is a corresponding count value storage area secured for the extracted category information, the process moves on to step S703 of FIG. 14 and operations according to step S703 and the subsequent process steps of FIG. 14 are performed.

On the other hand, if it is determined in step S1103 that there is no corresponding count value storage area secured for the extracted category information, the process moves on to step S1104 where the area setting unit 1280 secures a new count value storage area within the count value storage area 1212 as the corresponding count value storage area for the extracted category information in the manner described above in relation to FIG. 17.

After the new count value storage area is secured in step S1104, the process moves on to step S1105 where the correspondence information generating unit 1285 generates correspondence information and stores the generated correspondence information in the storage area correspondence table 1211 to update the storage area correspondence table 1211.

After step S1105, the process moves on to step S1106 where the charge managing information generating unit 1290 generates charge managing information based on the correspondence information generated in step S1105 and transmits the generated charge managing information to the charge managing server 1300A.

After step S1106, the process moves on to step S1107 where the charge managing information acquiring unit 1350 of the charge managing server 1300A acquires charge managing information that is transmitted thereto and stores the acquired charge managing information in the charge table 1312 to update the charge table 1312.

After the charge table 1312 is updated, the process moves on to step S703 of FIG. 14 and operations according to step S703 and the subsequent process steps of FIG. 14 are performed.

As can be appreciated from the above descriptions, according to an aspect of the present embodiment, when there is no corresponding count value storage area secured for category information that is extracted from acquired input data, a corresponding count value storage area for the extracted category information may be dynamically secured within the count value storage unit 1212. Thus, even when the image forming apparatus 1200A acquires input data belonging to a category that is not pre-registered in the image forming apparatus 1200A, complicated operations do not have to be performed to have output data individually counted with respect to each different category, for example.

According to a further aspect of the present embodiment, even when input data are subdivided into detailed categories, complicated setting operations do not have to be performed to have output data individually counted with respect to each different category, for example. Thus, in the charge managing system 1100A according to the present embodiment, a charge process may be individually performed on output data corresponding to each set of category information, and a fee may be charged according to the type or value of information output by the image forming apparatus 1200A.

It is noted that although the present invention is described above with respect to certain preferred embodiments, the present invention is not limited to the specifically disclosed embodiments, and variations and modifications may be made without departing from the scope of the present invention.

The present application is based on and claims the benefit of the earlier filing date of Japanese Patent Application No. 2007-153317, filed on Jun. 8, 2007 and Japanese Patent Application No. 2007-153318, filed on Jun. 8, 2007, the entire contents of which are hereby incorporated by reference.

The invention claimed is:

1. A management system, comprising:
an apparatus including
    an executing unit configured to execute a specific application;
    a value acquiring unit configured to acquire a count value of result items corresponding to a process content of the specific application executed by the executing unit, each result item corresponding to a result of the specific application; and
    a sending unit configured to send the count value of result items acquired by the value acquiring unit and information identifying the specific application corresponding to the value to a management server; and
the management server including
    a memory storing a price-per-result-item for each of a plurality of applications including the specific application;
    a receiving unit configured to receive the value of result items and the identifying information identifying the specific application from the apparatus; and
    a calculating unit configured to calculates a price for using the specific application based on both the received count value of the result items and the stored price-per-result-item corresponding to the specific application identified by the received identifying information.

2. The management system as claimed in claim 1, wherein the count value of result items corresponding to the process content includes a number of printing paper sheets or a data amount.

3. The management system as claimed in claim 1, wherein the specific application executed by the application executing unit is obtained from an external apparatus.

4. The management system as claimed in claim 1, wherein the application executing unit is configured to execute plural applications.

5. A management system, comprising:
   an apparatus including
      an executing unit configured to execute an application;
      a value acquiring unit configured to acquire a count value of result items corresponding to a process content of the specific application executed by the executing unit, each result item corresponding to a result of the specific application; and
      a sending unit configured to send the count value of result acquired by the value acquiring unit and identifying information identifying the specific application corresponding to the value to a management server; and
   the management server including
      a first storing unit that stores information of a user of the management system;
      a receiving unit configured to receive the count value of result items and the identifying information identifying the specific application from the apparatus; and
      a second storing unit that stores the information of the user, the count value of result items, a price-per-result-item for each of a plurality of applications including the specific application, and the identifying information identifying the specific application in association with one another.

6. The management system as claimed in claim 5, wherein the management server further comprises:
   a calculator configured to calculate a price for using the specific application for the user based on the stored information of the user, the count value of result items, and the price-per-result-item corresponding to the specific application identified by the received identifying information.

7. The management system as claimed in claim 5, wherein the count value of result items corresponding to the process content includes a number of printing paper sheets or a data amount.

8. The management system as claimed in claim 5, wherein the specific application executed by the application executing unit is obtained from an external apparatus.

9. The management system as claimed in claim 5, wherein the application executing unit is configured to execute plural applications.

10. The management system of claim 1, wherein the memory stores, for each respective application of the plurality of applications, the price-per-result-item, which is set according to a type of information processed by the respective application.

11. The management system of claim 5, wherein the second storing unit stores, for each respective application of the plurality of applications, the price-per-result-item, which is set according to a type of information processed by the respective application.

* * * * *